US010836340B2

(12) United States Patent
Obayashi et al.

(10) Patent No.: US 10,836,340 B2
(45) Date of Patent: Nov. 17, 2020

(54) AIRBAG APPARATUS

(71) Applicant: HONDA MOTOR CO., LTD., Tokyo (JP)

(72) Inventors: Yuya Obayashi, Wako (JP); Seiji Kobata, Wako (JP); Masahiro Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 77 days.

(21) Appl. No.: 16/210,058

(22) Filed: Dec. 5, 2018

(65) Prior Publication Data
US 2019/0202395 A1    Jul. 4, 2019

(30) Foreign Application Priority Data

Dec. 28, 2017    (JP) ................................. 2017-254245

(51) Int. Cl.
*B60R 21/231* (2011.01)
*B60R 21/2338* (2011.01)
*B60R 21/232* (2011.01)

(52) U.S. Cl.
CPC ...... *B60R 21/23138* (2013.01); *B60R 21/231* (2013.01); *B60R 21/2338* (2013.01);
(Continued)

(58) Field of Classification Search
CPC ............ B60R 21/23138; B60R 21/231; B60R 21/2338; B60R 2021/23161;
(Continued)

(56) References Cited

U.S. PATENT DOCUMENTS 3,984,750 A * 10/1976 Pfeffer .................. H02J 7/1484
                                                       363/67
4,536,008 A *  8/1985 Brown, Jr. ............ B60R 21/213
                                                       280/730.1
(Continued)

FOREIGN PATENT DOCUMENTS

DE    1020080398657    3/2010
EP         2699454    11/2017
(Continued)

OTHER PUBLICATIONS

Japanese Office Action for Japanese Patent Application No. 2017-254245 dated Jul. 2, 2019.
(Continued)

*Primary Examiner* — Darlene P Condra
(74) *Attorney, Agent, or Firm* — Amin, Turocy & Watson, LLP

(57)  ABSTRACT

An airbag apparatus inflates to be spread such that a front side and both sides of at least one occupant are surrounded. The airbag apparatus includes an airbag's bag body that has the first bag body, the second bag body, and the third bag body which are integrally formed and inflate to be spread on one side, the front side, and the other side of the occupant; and an energy absorbing portion that causes an upper portion of the first bag body and an upper portion of the third bag body to be coupled to a vehicle body, generates a load reaction force for supporting the airbag's bag body when the occupant is restrained, and allows the airbag's bag body to move.

17 Claims, 27 Drawing Sheets

(52) U.S. Cl.
CPC ... *B60R 21/232* (2013.01); *B60R 2021/23161* (2013.01); *B60R 2021/23386* (2013.01)

(58) Field of Classification Search
CPC ........ B60R 21/232; B60R 2021/23386; B60R 2021/23107; B60R 21/23
See application file for complete search history.

(56) References Cited

U.S. PATENT DOCUMENTS

| | | | | |
|---|---|---|---|---|
| 6,722,691 | B1* | 4/2004 | Håland | B60R 21/233 280/730.1 |
| 6,966,579 | B2* | 11/2005 | Schneider | B60R 21/2338 280/728.2 |
| 7,988,194 | B2* | 8/2011 | McFadden | B60R 21/233 280/743.1 |
| 2011/0012328 | A1* | 1/2011 | Ewing | B60R 21/232 280/730.2 |
| 2018/0208142 | A1* | 7/2018 | Barbat | B60R 21/231 |

FOREIGN PATENT DOCUMENTS

| | | |
|---|---|---|
| JP | 49-068127 | 6/1974 |
| JP | 2001-334945 | 12/2001 |
| JP | 2002-534321 | 10/2002 |
| JP | 2009-241790 | 10/2009 |
| JP | 2010-052731 | 3/2010 |
| JP | 2010-162940 | 7/2010 |
| JP | 2012-224139 | 11/2012 |
| JP | 2013-082418 | 5/2013 |
| JP | 2013-233897 | 11/2013 |
| JP | 2016-002800 | 1/2016 |

OTHER PUBLICATIONS

German Search Report for German Patent Application No. 102018221787.4 dated Jul. 31, 2019.

* cited by examiner

AIRBAG APPARATUS

CROSS-REFERENCE TO RELATED APPLICATION

Priority is claimed on Japanese Patent Application No. 2017-254245, filed Dec. 28, 2017, the content of which is incorporated herein by reference.

BACKGROUND OF THE INVENTION

Field of the Invention

The present invention relates to an airbag apparatus.

Description of Related Art

For example, airbag apparatuses, in which an airbag's bag body is held at a predetermined position, the airbag's bag body performs controlled motion, and an energy absorbing portion for restraining and protecting an occupant is provided, are known. Regarding this energy absorbing portion, a configuration, in which a wedge is attached to an end portion of a strap, the wedge is movably held inside a wedge lock, and the wedge lock is fixed to a vehicle, has been disclosed.

According to this energy absorbing portion, the airbag's bag body is moved together with the strap by moving the wedge along the inside of the wedge lock, so that an occupant can be suitably restrained (for example, refer to Japanese Unexamined Patent Application, First Publication No. 2010-52731 (hereinafter, Patent Document 1)).

SUMMARY OF THE INVENTION

However, in an airbag apparatus of Patent Document 1, a part for attaching an airbag's bag body to a vehicle is not specifically disclosed. Therefore, it is desired to realize practical application of an airbag apparatus in which the airbag's bag body is moved to absorb impact energy.

In addition, in the airbag apparatus of Patent Document 1, a configuration in which the absorption amount of impact energy is controlled in stages control is also not disclosed.

Incidentally, regarding an airbag apparatus for absorbing impact energy, a configuration, in which a vent hole (an opening portion) is formed in an airbag's bag body and gas is discharged through the vent hole to absorb impact energy, is known. In this manner, a large amount of gas is required to discharge gas from the inside of the airbag's bag body and to absorb impact energy. Accordingly, the shape of an inflator becomes large, and this has hindered reduction in costs and weight reduction in an airbag apparatus from being realized.

In addition, according to this airbag apparatus, it is assumed that the timing of restraining an occupant and the direction of restraining an occupant are regulated by the vent hole. Therefore, in order to suitably restrain an occupant, the inflator and the airbag's bag body become complicated.

Moreover, a structure for discharging gas from the inside of the airbag's bag body and absorbing impact energy requires a device for stably absorbing impact energy.

An aspect of the present invention has been made in consideration of the foregoing circumstances, and an object thereof is to provide an airbag apparatus which can absorb impact energy by moving an airbag's bag body.

In order to solve the problems described above and to achieve the object thereof, the present invention employs the following aspect.

(1) According to an aspect of the present invention, there is provided an airbag apparatus which inflates to be spread such that a front side and both sides of at least one occupant are surrounded. The airbag apparatus includes an airbag's bag body that has a first bag body, a second bag body, and a third bag body which are integrally formed and inflate to be spread on one side, the front side, and the other side of the occupant; and an energy absorbing portion that causes an upper portion of the first bag body and an upper portion of the third bag body to be coupled to a vehicle body, generates a load reaction force for supporting the airbag's bag body when the occupant is restrained, and allows the airbag's bag body to move.

In this manner, the airbag's bag body is formed to include the first bag body, the second bag body, and the third bag body, and the front side and both sides of an occupant are surrounded with the first to third bag bodies. Moreover, the upper portion of the first bag body and the upper portion of the third bag body (that is, the upper portion of the airbag's bag body) are coupled to the vehicle body by the energy absorbing portion. The energy absorbing portion is configured to generate a load reaction force for supporting the airbag's bag body when an occupant is restrained and to allow the airbag's bag body to move.

In this manner, the airbag's bag body is moved while being supported by a load reaction force. Therefore, the impact energy acting on an occupant can be suitably absorbed by performing mechanical control.

In addition, in a state in which the first bag body, the second bag body, and the third bag body (that is, the airbag's bag body) inflate to be spread, the front side and both sides of an occupant can be surrounded with the airbag's bag body.

Thus, an occupant can be restrained by each of the bag bodies in all directions including forward in the vehicle body, outward in a vehicle width direction, and inward in the vehicle width direction with respect to the occupant.

In a state in which an occupant is restrained by each of the bag bodies, the airbag's bag body is moved while a load reaction force is applied to the airbag's bag body. Therefore, the occupant can be suitably protected in all directions.

Moreover, in the airbag's bag body, there is no need to form a vent hole (an opening portion) for discharging gas in the airbag's bag body, in order to absorb impact energy. Accordingly, an occupant can be suitably restrained without causing the timing of restraining the occupant and the direction of restraining the occupant to be regulated by the vent hole.

In addition, since there is no need to form a vent hole in the airbag's bag body, a structure for absorbing impact energy (that is, the energy absorbing portion) can be simplified, and cost reduction or weight reduction of the airbag apparatus can be realized.

Moreover, the energy absorbing portion is configured to absorb impact energy by performing mechanical control in which the airbag's bag body is moved while being supported by a load reaction force, instead of being configured to absorb impact energy by discharging gas through the vent hole of the airbag's bag body. Accordingly, impact energy can be stably absorbed by the energy absorbing portion.

In addition, according to the configuration in which impact energy is absorbed by discharging gas through a vent hole, when impact energy is absorbed in multiple stages (in stages), there is a need to control the amount of gas to be supplied to the inside of the airbag's bag body from an inflator, so that it is difficult to cope with absorption in multiple stages.

In contrast, the energy absorbing portion is configured to absorb impact energy by performing mechanical control. Thus, impact energy can be absorbed in multiple stages without performing control or the like of the amount of gas to be supplied from the inflator to the inside of the airbag's bag body.

(2) In (1) described above, the energy absorbing portion may be configured to cause the load reaction force restraining the occupant to change during a later restraint period rather than an early restraint period with respect to the occupant.

In this manner, a load reaction force restraining an occupant changes during the later restraint period rather than the early restraint period. Thus, for example, an excessively large load reaction force is inhibited from acting on an occupant during the early restraint period, and a relatively large load reaction force can be caused to act on an occupant during the later restraint period. Accordingly, a favorable load reaction force can be caused to act in accordance with the state of an occupant, so that the occupant can be suitably restrained.

Here, the load acting on the airbag apparatus changes depending on the vehicle including the airbag apparatus when an occupant is restrained by the airbag apparatus. For example, there is an airbag apparatus having a configuration in which an intermediate load acts during the early restraint period, a heavy load acts thereafter, and a light load acts during the later restraint period when an occupant is restrained by the airbag apparatus. On the other hand, there is an airbag apparatus having a configuration in which a light load acts during the early restraint period, an intermediate load acts thereafter, and a heavy load acts during the later restraint period. Alternatively, there is an airbag apparatus having a configuration in which a light load, an intermediate load, and a heavy load act in an appropriately combined state.

In this case, it is preferable that a load reaction force change in accordance with each of the light load, the intermediate load, and the heavy load from the early restraint period to the later restraint period with respect to an occupant.

Accordingly, the airbag apparatus can be employed for various kinds of vehicles, and the usage of the airbag apparatus can be expanded.

(3) In (1) or (2) described above, the energy absorbing portion may be configured to cause the load reaction force restraining the occupant to change in multiple stages from an early restraint period to a later restraint period.

In this manner, a load reaction force restraining an occupant changes in multiple stages from the early restraint period to the later restraint period. Thus, for example, a load reaction force acting on an occupant can be gradually increased in accordance with the state of the occupant. Accordingly, an excessively large load reaction force is inhibited from acting on an occupant during the early restraint period, so that the occupant can be suitably restrained.

Here, the load acting on the airbag apparatus changes depending on the vehicle including the airbag apparatus when an occupant is restrained by the airbag apparatus. For example, there is an airbag apparatus having a configuration in which an intermediate load acts during the early restraint period, a heavy load acts thereafter, and a light load acts during the later restraint period when an occupant is restrained by the airbag apparatus. On the other hand, there is an airbag apparatus having a configuration in which a light load acts during the early restraint period, an intermediate load acts thereafter, and a heavy load acts during the later restraint period. Alternatively, there is an airbag apparatus having a configuration in which a light load, an intermediate load, and a heavy load act in an appropriately combined state.

In this case, it is preferable that a load reaction force change in multiple stages in accordance with each of the light load, the intermediate load, and the heavy load from the early restraint period to the later restraint period with respect to an occupant.

Accordingly, the airbag apparatus can be employed for various kinds of vehicles, and the usage of the airbag apparatus can be expanded.

(4) In any one of (1) to (3) described above, the energy absorbing portion may be configured to generate the load reaction force and to allow the airbag's bag body to move by causing a plate-shaped member to be deformed when the occupant is restrained.

In this manner, the airbag's bag body can be moved while a load reaction force is generated in the airbag's bag body by causing the plate-shaped member to be deformed. Accordingly, the impact energy acting on an occupant can be absorbed by performing mechanical control with a simple configuration in which the plate-shaped member is deformed only.

In addition, a load reaction force can be simply adjusted by changing the plate thickness dimension of the plate-shaped member. For example, a load reaction force can be simply adjusted to be low by setting a relatively small plate thickness dimension of the plate-shaped member. In addition, a load reaction force can be simply adjusted to be high by setting a relatively large plate thickness dimension of the plate-shaped member.

Moreover, a load reaction force can be adjusted in stages by increasing the plate thickness dimension of the plate-shaped member in stages from a front end portion side toward a rear end portion side. Accordingly, the impact energy acting on an occupant can also be absorbed in multiple stages.

(5) In (4) described above, the airbag's bag body may be supported in an accommodated state above the plate-shaped member.

Here, for example, it is assumed that a portion of a part in the upper portion of the airbag's bag body is disposed along a roof side rail of a vehicle. In this case, for example, it is assumed that a joint flange of the roof side rail bulges out along the roof side rail. Therefore, it is assumed that the airbag's bag body comes into contact with the joint flange in a state in which the airbag's bag body is disposed along the roof side rail.

Therefore, the airbag's bag body is supported in an accommodated state above the plate-shaped member. Thus, the plate-shaped member can prevent the airbag's bag body from coming into contact with the joint flange. Accordingly, the airbag's bag body can be protected from the joint flange, so that the quality of the airbag's bag body can be further enhanced.

(6) In (4) or (5) described above, the energy absorbing portion may be configured to generate the load reaction force and to allow the airbag's bag body to move by cutting the plate-shaped member from a distal end.

In this manner, a load reaction force is generated by cutting the plate-shaped member cut from the distal end. Accordingly, stability of a load reaction force can be obtained with respect to a change in a direction of a load for cutting the plate-shaped member (that is, a pulling input of the airbag's bag body), so that the degree of freedom in design can be enhanced.

In addition, as the energy absorbing portion cutting the plate-shaped member from the distal end, for example, it is assumed to adopt a configuration in which a curved cutter is disposed at the distal end of the plate-shaped member, a wire hung in the cutter is fixed to one surface of the plate-shaped member, and the upper portion of the airbag's bag body is coupled to a wire on the other surface side of the plate-shaped member.

According to this configuration, the cutter plays a role of a pulley, so that a large moving amount of the upper portion of the airbag's bag body can be ensured. Accordingly, size reduction of the energy absorbing portion can be realized.

(7) In any one of (1) to (3) described above, the energy absorbing portion may be configured to generate the load reaction force and to allow the airbag's bag body to move by operating a pulley.

In this manner, a load reaction force is generated by operating the pulley. That is, a wire is hung in the pulley, and the wire hung in the pulley is pulled with a pulling input of the airbag's bag body. Thus, for example, the pulley can be operated even when the direction of a pulling input has changed to a certain extent. Accordingly, stability of a load reaction force can be obtained with respect to a change in a direction of a pulling input for operating the pulley, so that the degree of freedom in design can be enhanced.

In addition, the pulley is configured to be operated by pulling the wire hung in the pulley with a pulling input of the airbag's bag body. Thus, the pulling amount of the wire (that is, the moving amount of the upper portion of the airbag's bag body) can be significantly ensured. Accordingly, size reduction of the energy absorbing portion can be realized.

(8) In any one of (4) to (6) described above, the energy absorbing portion may be configured to generate the load reaction force and to allow the airbag's bag body to move by stretching the plate-shaped member from a wound state.

In this manner, an accommodation space of the energy absorbing portion can be minimized by accommodating the plate-shaped member in a wound state. In addition, the pulling amount of the plate-shaped member (that is, the moving amount of the upper portion of the airbag's bag body) can be significantly ensured by stretching the plate-shaped member from a wound state. Accordingly, size reduction of the energy absorbing portion can be realized in a state in which the moving amount (that is, an operation stroke) of the plate-shaped member is ensured.

In addition, a load reaction force can be simply adjusted by changing the plate thickness dimension of the plate-shaped member. For example, a load reaction force can be simply adjusted to be low by setting a relatively small plate thickness dimension of the plate-shaped member. In addition, a load reaction force can be simply adjusted to be high by setting a relatively large plate thickness dimension of the plate-shaped member.

Moreover, a load reaction force can be adjusted in stages by increasing the plate thickness dimension of the plate-shaped member in stages from the front end portion side toward the rear end portion side. Accordingly, the impact energy acting on an occupant can also be absorbed in multiple stages.

(9) In any one of (1) to (3) described above, the energy absorbing portion may include a plate-shaped member which is coupled to the upper portion via a coupling portion, and a box member which accommodates the plate-shaped member and has an opening portion penetrating the coupling portion and being formed to have a width dimension smaller than a width dimension of the plate-shaped member. The plate-shaped member may be deformed to generate the load reaction force when the plate-shaped member is drawn out through the opening portion.

In this manner, when the plate-shaped member is drawn out through the opening portion of the box member, the plate-shaped member is deformed to generate a load reaction force. Thus, a load reaction force can be simply adjusted by changing the plate thickness dimension of the plate-shaped member. For example, a load reaction force can be simply adjusted to be low by setting a relatively small plate thickness dimension of the plate-shaped member. In addition, a load reaction force can be simply adjusted to be high by setting a relatively large plate thickness dimension of the plate-shaped member.

Moreover, a load reaction force can be adjusted in stages by increasing the plate thickness dimension of the plate-shaped member in stages from the front end portion side toward the rear end portion side. Accordingly, the impact energy acting on an occupant can also be absorbed in multiple stages.

(10) Any one of (1) to (9) described above may include an inflator that communicates with the airbag's bag body via a communication portion and causes the airbag's bag body to inflate to be spread by supplying gas to the airbag's bag body through the communication portion. The communication portion may be formed to be stretchable.

In this manner, the airbag's bag body can be moved in a state in which the inflator is fixed to the vehicle body by forming the communication portion to be stretchable. Thus, when an occupant is restrained, the airbag's bag body can be moved in a state in which a load reaction force is generated in the airbag's bag body. In this manner, the airbag's bag body is moved while being supported by a load reaction force. Therefore, the impact energy acting on an occupant can be suitably absorbed by performing mechanical control.

(11) In (10) described above, the communication portion may be formed in a tubular shape, and a peripheral wall may be contracted in a state of being folded in an overlapping manner.

In this manner, the peripheral wall of the communication portion is contracted in an overlapping state. Therefore, the contracted communication portion can be retained in a hollow shape. Accordingly, when gas is supplied to the airbag's bag body from the inflator, gas can be smoothly supplied to the airbag's bag body through the communication portion.

In addition, an occupant is restrained by the airbag's bag body that has inflated to be spread. Therefore, when the airbag's bag body moves, the folded communication portion can be extended in a manner of following the movement of the airbag's bag body. Accordingly, the airbag's bag body can be favorably moved such that a state of suitably restraining an occupant is retained.

(12) In (10) described above, the communication portion may be formed in a tubular shape, and a peripheral wall may be contracted in a bellows shape.

In this manner, the peripheral wall of the communication portion is contracted in a bellows shape. Therefore, the contracted communication portion can be retained in a hollow shape. Accordingly, when gas is supplied to the airbag's bag body from the inflator, gas can be smoothly supplied to the airbag's bag body through the communication portion.

In addition, an occupant is restrained by the airbag's bag body that has inflated to be spread. Therefore, when the airbag's bag body moves, the communication portion in a bellows shape can be extended in a manner of following the movement of the airbag's bag body. Accordingly, the airbag's bag body can be favorably moved such that a state of suitably restraining an occupant is retained.

(13) (12) described above may include an inner peripheral wall that is provided inside the communication portion. The inner peripheral wall may inhibit extension of the peripheral wall contracted in a bellows shape when the airbag's bag body inflates to be spread, and the inner peripheral wall may allow extension of the peripheral wall contracted in a bellows shape when the occupant is restrained by the airbag's bag body that has inflated to be spread.

In this manner, the inner peripheral wall is provided inside the communication portion. That is, the peripheral wall contracted in a bellows shape can be covered with the inner peripheral wall. Thus, the inner peripheral wall can inhibit gas from infiltrating into the peripheral wall contracted in a bellows shape when the airbag's bag body inflates to be spread. Accordingly, extension of the peripheral wall contracted in a bellows shape can be inhibited when the airbag's bag body inflates to be spread. As a result, the airbag's bag body can be caused to more quickly inflate to be spread.

On the other hand, when an occupant is restrained by the airbag's bag body that has inflated to be spread, the airbag's bag body moves together with an occupant. Thus, a load is input from the airbag's bag body to the peripheral wall contracted in a bellows shape.

Accordingly, the airbag's bag body can be allowed to move by extending the peripheral wall contracted in a bellows shape. As a result, an occupant can be more favorably restrained and protected by the airbag's bag body.

(14) In any one of (1) to (13) described above, the energy absorbing portion may include a movement restricting mechanism which restricts the airbag's bag body from moving in a vehicle width direction.

In this manner, the energy absorbing portion includes the movement restricting mechanism. Therefore, the movement restricting mechanism can restrict movement of the airbag's bag body in the vehicle width direction. Accordingly, an occupant can be more favorably restrained by the airbag's bag body.

(15) In any one of (1) to (14) described above, a plurality of energy absorbing portions may be provided, and a load reaction force generated by each of the energy absorbing portions may be set to a different value.

Here, when an occupant is restrained by the airbag's bag body, a different restraining force is applied to each part of an occupant (for example, the chest or the head) restrained by the airbag's bag body. Therefore, load reaction forces generated by the plurality of energy absorbing portions are respectively set to values different from each other. Accordingly, a load reaction force can be adjusted for each part of an occupant (for example, the chest or the head) restrained by the airbag's bag body by changing a load reaction force of each of the energy absorbing portions. As a result, an occupant can be more favorably restrained and protected by the airbag's bag body.

According to the aspect of the present invention, the airbag's bag body is coupled to the vehicle body via the energy absorbing portion. Thus, when an occupant is restrained, a load reaction force for supporting the airbag's bag body is generated and the airbag's bag body can be allowed to move. Accordingly, impact energy can be absorbed by moving the airbag's bag body.

DETAILED DESCRIPTION OF THE INVENTION

Figure 1:
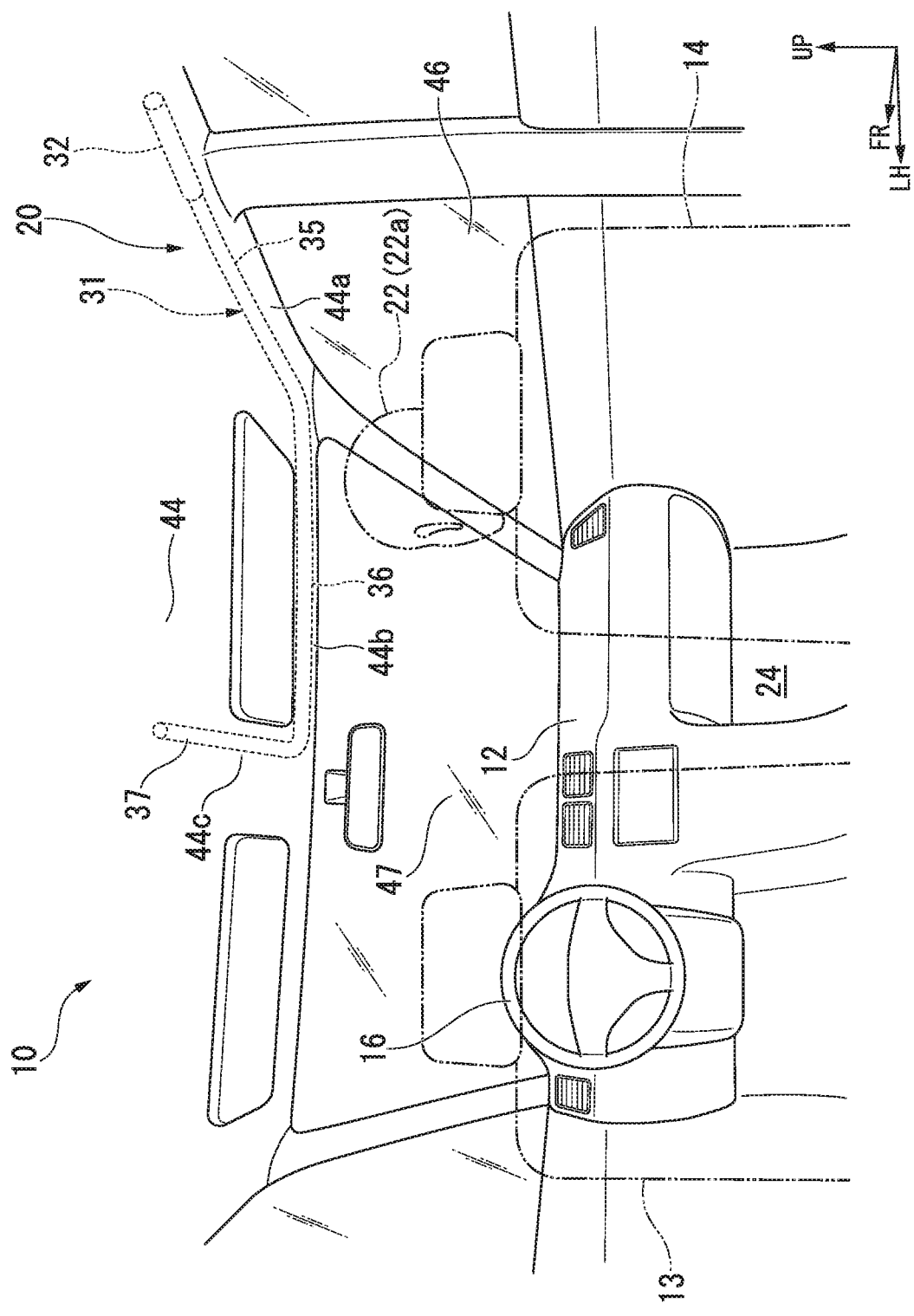
FIG. 1 is a perspective view illustrating a vehicle in which an airbag apparatus according to a first embodiment of the present invention is housed.

Embodiments of the present invention will be described on the basis of the drawings. In the drawings, an arrow FR is directed to the front side of a vehicle, an arrow UP is directed to the upper side of the vehicle, and an arrow LH is directed to the left side of the vehicle. In addition, in the embodiments, for example, a vehicle 10, in which a driver's seat 13 (a seat for a driver) is disposed on the left side of the vehicle, and a passenger seat 14 (a seat for a passenger) is disposed on the right side of the vehicle, will be described.

First Embodiment

As illustrated in FIG. 1, the vehicle 10 includes an instrument panel 12, the driver's seat 13, the passenger seat 14, a steering wheel 16, and an airbag apparatus 20.

In the embodiment, the airbag apparatus 20 which restrains and protects an upper half 22a of the body of an occupant 22 sitting on the passenger seat 14 will be described as a representative example.

The instrument panel 12 is provided on the front side of a vehicle body in a vehicle interior 24. The driver's seat 13 and the passenger seat 14 are provided on the rear side of the vehicle body from the instrument panel 12. The steering wheel 16 is provided on the front side of the vehicle body from the driver's seat 13. A driver sits on the driver's seat 13. A passenger (who will hereinafter be referred to as an occupant) 22 sits on the passenger seat 14.

Figure 5:
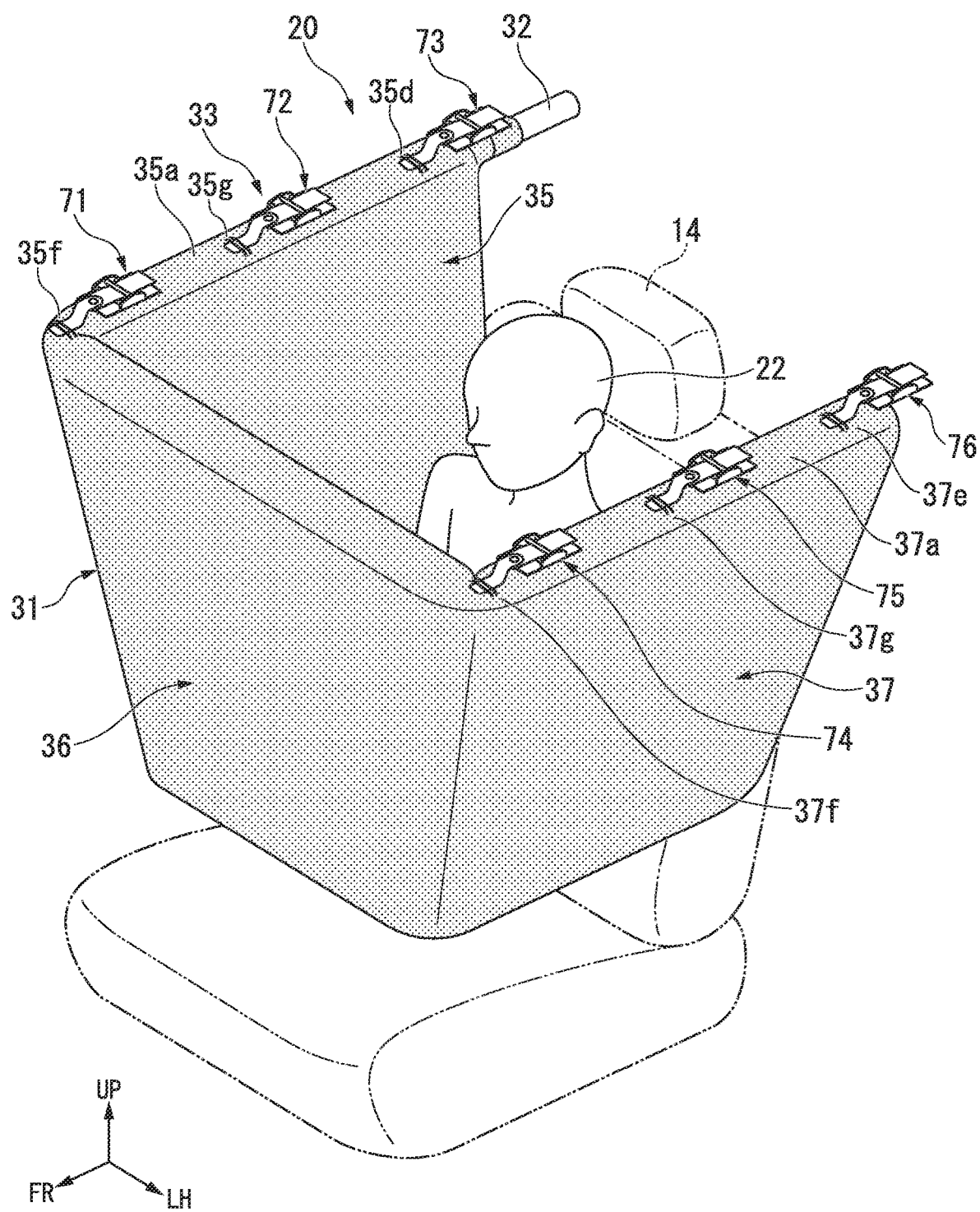
FIG. 5 is a perspective view illustrating a state in which the airbag apparatus according to the first embodiment of the present invention inflates to be spread.

The airbag apparatus 20 includes an airbag's bag body 31, an inflator 32, and an energy absorbing unit 33 (refer to FIG. 5).

Figure 3:
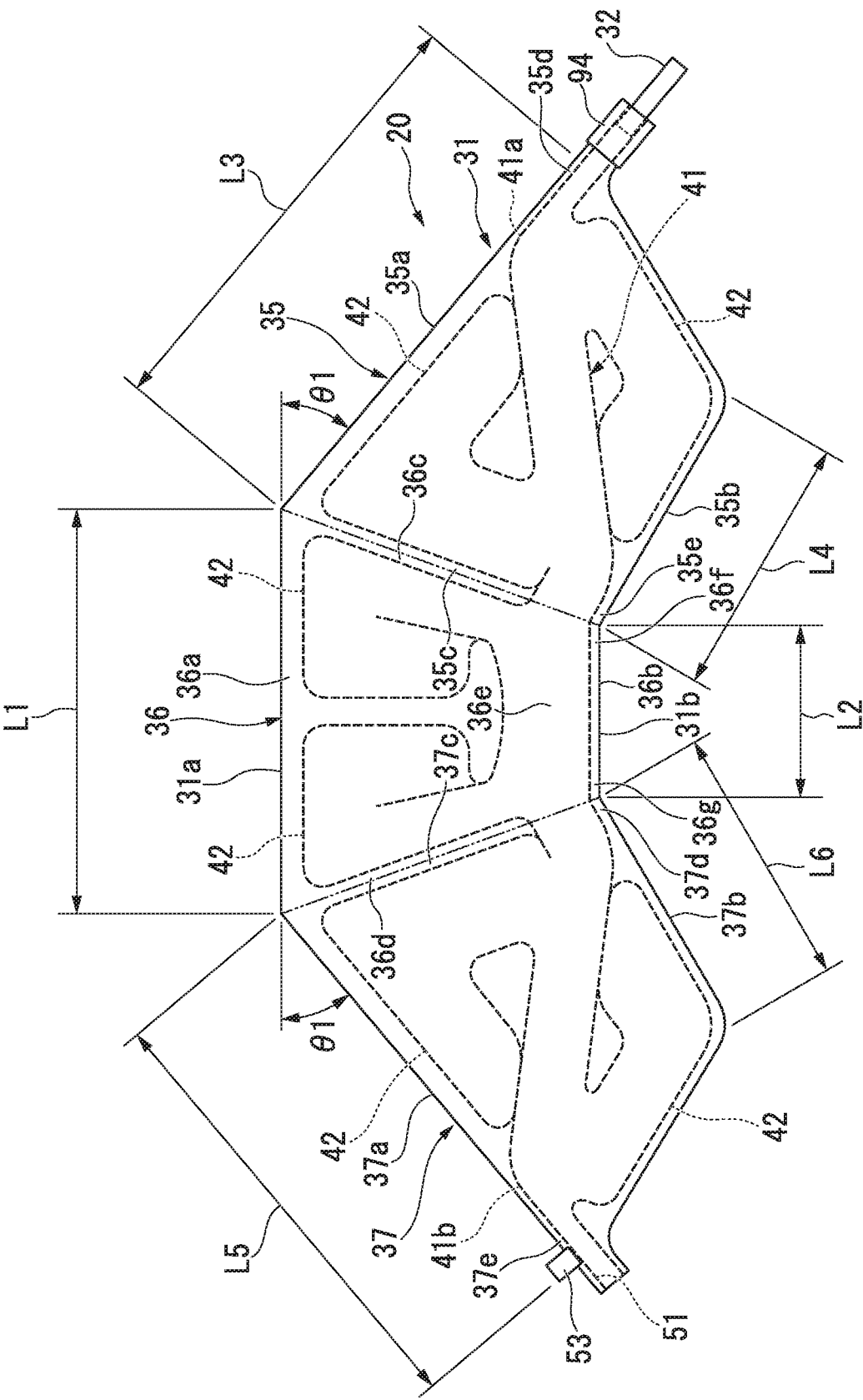
FIG. 3 is a plan view illustrating an airbag's bag body according to the first embodiment of the present invention.

The airbag's bag body 31 includes a first bag body 35, a second bag body 36, a third bag body 37, a first flow channel 41 (refer to FIG. 3), and a plurality of second flow channels 42 (refer to FIG. 3).

The first bag body 35, the second bag body 36, and the third bag body 37 are folded in an accommodated state and are housed (mounted) above a head lining 44 of the vehicle 10.

The airbag's bag body 31 is formed in a U-shape in a state in which the first bag body 35, the second bag body 36, and the third bag body 37 are folded in an accommodated state.

Here, for example, the first bag body 35 is housed above a right side portion 44a of the head lining 44 along a roof rail. In addition, for example, the second bag body 36 is housed above a front end portion 44b of the head lining 44 along a front roof member. Moreover, for example, the third bag body 37 is housed above a middle 44c of the head lining 44 in a vehicle width direction along a middle roof rail.

Figure 2:
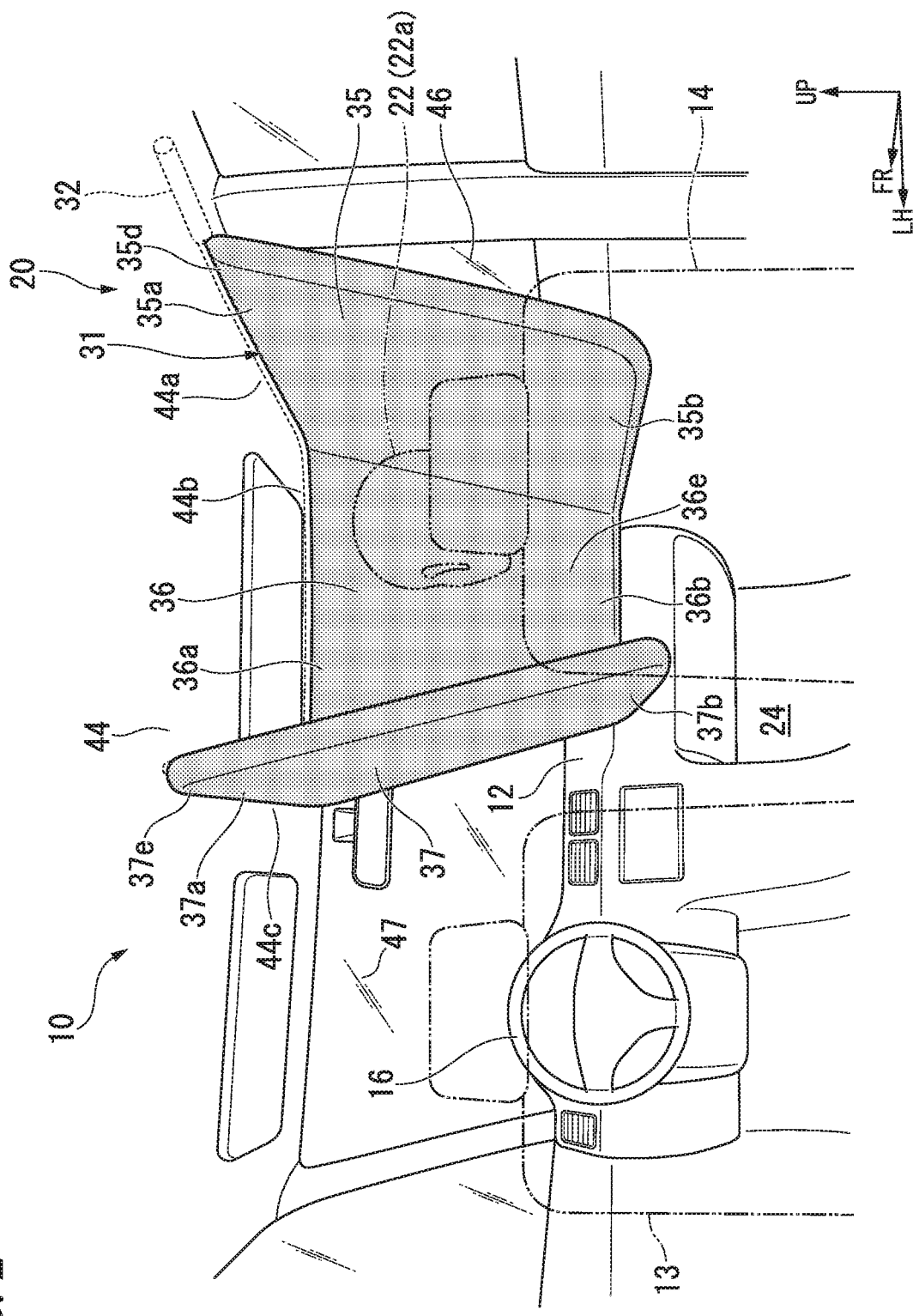
FIG. 2 is a perspective view illustrating a vehicle in which the airbag apparatus according to the first embodiment of the present invention inflates to be spread.

As illustrated in FIG. 2, in the airbag apparatus 20, when an impact load is input to the vehicle 10, gas is injected into the airbag's bag body 31 from the inflator 32, and the airbag's bag body 31 inflates to be spread. The airbag's bag body 31 inflates to be spread downward in the vehicle interior 24 by tearing the head lining 44 due to the pressure when it inflates, or rolling the head lining 44.

For example, an airproof and soft material such as nylon woven fabric is used for the airbag's bag body 31, which is formed in a bag shape using polyamide yarn or the like. In addition, it is preferable that an inner surface of the airbag's bag body 31 be coated with rubber, silicon, or the like having heat resistant properties.

An upper end 35a of the first bag body 35 of the airbag's bag body 31 is disposed along the roof rail on the right side, so that the first bag body 35 inflates to be spread downward on the inner side of a right side window glass 46 in the vehicle width direction. In this state, the first bag body 35 is disposed on the right side (one side) of the upper half 22a of the body of the occupant 22 in the vehicle width direction.

In addition, an upper end 36a of the second bag body 36 is disposed along the front roof member, so that the second bag body 36 inflates to be spread downward on the inner side of a windshield 47 in the vehicle width direction. In this state, the second bag body 36 is disposed on the front side of the vehicle body (the front) from the upper half 22a of the body of the occupant 22.

Moreover, an upper end 37a of the third bag body 37 is disposed along the middle roof rail, so that the third bag body 37 inflates to be spread downward in the middle in the vehicle width direction. In this state, the third bag body 37 is disposed on the left side (the other side) of the upper half 22a of the body of the occupant 22 in the vehicle width direction.

Accordingly, the airbag's bag body 31 inflates to be spread such that the front side and both sides of the upper half 22a of the body of the occupant 22 are surrounded. The "front side and both sides of the upper half 22a of the body of the occupant 22" will be referred to as "all directions with respect to the upper half 22a of the body of the occupant 22".

Hereinafter, the configuration of the airbag's bag body 31 will be described in detail on the basis of FIGS. 2 and 3. FIG. 3 illustrates a spread state of the airbag's bag body 31 that has inflated to be spread in a plan view.

As illustrated in FIGS. 2 and 3, in a state of having inflated to be spread, the second bag body 36 is disposed on the front side of the vehicle body from the upper half 22a of the body of the occupant 22 and is formed in a trapezoidal shape such that a length dimension L2 of a lower end 36b is smaller than a length dimension L1 of the upper end 36a.

A front end 35c of the first bag body 35 is integrally formed with a right end 36c of the second bag body 36. The first bag body 35 is disposed on the right side of the upper half 22a of the body of the occupant 22 in the vehicle width direction, and the upper end 35a is inclined on a downward gradient at an angle θ1 with respect to the upper end 36a of the second bag body 36. The first bag body 35 is formed in a trapezoidal shape such that a length dimension L4 of a lower end 35b is smaller than a length dimension L3 of the upper end 35a.

The inflator 32 is attached to an upper rear corner portion (an upper end of the first bag body) 35d in the upper end 35a of the first bag body 35. For example, the inflator 32 is attached to the roof rail on the right side (that is, the vehicle body).

A front end 37c of the third bag body 37 is integrally formed with a left end 36d of the second bag body 36. The third bag body 37 is formed to have substantially bilateral symmetry with the first bag body 35. That is, the third bag body 37 is disposed on the left side of the upper half 22a of the body of the occupant 22 in the vehicle width direction, and the upper end 35a is inclined on a downward gradient at the angle θ1 with respect to the upper end 36a of the second bag body 36. The third bag body 37 is formed in a trapezoidal shape such that a length dimension L6 of a lower end 37b is smaller than a length dimension L5 of the upper end 37a.

The upper end 35a of the first bag body 35, the upper end 36a of the second bag body 36, and the upper end 37a of the third bag body 37 are connected and form a top side 31a of the airbag's bag body 31. In addition, the lower end 35b of the first bag body 35, the lower end 36b of the second bag body 36, and the lower end 37b of the third bag body 37 are connected and form a bottom side 31b of the airbag's bag body 31.

The top side 31a of the airbag's bag body 31 is formed to have a length dimension larger than that of the bottom side 31b of the airbag's bag body 31.

The airbag's bag body 31 includes the first flow channel (the gas flow channel) 41 and the plurality of second flow channels 42. The first flow channel 41 is formed in each of the bag bodies 35 to 37 in a manner of linearly extending to the third bag body 37 from the first bag body 35 through the second bag body 36.

Specifically, a part of the first flow channel 41 on the right side diagonally extends downward to a lower front corner portion 35e of the first bag body 35 from the upper rear corner portion 35d of the first bag body 35. In other words, a part of the first flow channel 41 on the right side is formed downward to the second bag body 36 from the first bag body 35.

In addition, the middle part of the first flow channel 41 linearly extends to a lower front corner portion 37d of the third bag body 37 from the lower front corner portion 35e of the first bag body 35 along the lower end 36b of the second bag body 36. In other words, the middle part of the first flow channel 41 is formed in a lower portion 36e of the second bag body 36.

Moreover, a part of the first flow channel 41 on the left side diagonally extends upward to an upper rear corner portion 37e of the third bag body 37 from the lower front corner portion 37d of the third bag body 37. In other words, a part of the first flow channel 41 on the left side is formed upward to the third bag body 37 from the lower portion 36e of the second bag body 36.

Here, in a spread state of the airbag's bag body 31 that has inflated to be spread in a plan view, the first flow channel 41 linearly extends to the upper rear corner portion 37e of the third bag body 37 from the upper rear corner portion 35d of the first bag body 35 through the lower end 36b of the second bag body 36.

The inflator 32 is attached to the upper rear corner portion 35d of the first bag body 35. Thus, the upper rear corner portion 35d of the first bag body 35 is attached to the roof rail on the right side (that is, the vehicle body) via the inflator 32.

In addition, an opening portion 51 of the first flow channel 41 is formed in the upper rear corner portion 37e of the third bag body 37. Moreover, the upper rear corner portion 37e of the third bag body 37 is attached to the vehicle body via an attachment portion 53.

Moreover, in a spread state of the airbag's bag body 31 that has inflated to be spread in a plan view, the first flow channel 41 linearly extends to the upper rear corner portion 37e of the third bag body 37 from the upper rear corner portion 35d of the first bag body 35 through the lower end 36b of the second bag body 36.

Thus, a leading end portion 41a of the first flow channel 41 is coupled to the roof rail on the right side (that is, the vehicle body) via the upper rear corner portion 35d of the first bag body 35. In addition, a trailing end portion 41b of the first flow channel 41 is coupled to the vehicle body via the upper rear corner portion 37e of the third bag body 37.

In addition, the plurality of second flow channels 42 communicate with the first flow channel 41 in the first to third bag bodies 35 to 37. That is, in the first bag body 35, the second flow channel 42 is provided on the upper side and the lower side of the first flow channel 41. The second flow channel 42 on the upper side communicates with the first flow channel 41 in the lower front corner portion 35e of the first bag body 35. The second flow channel 42 on the lower side communicates with the first flow channel 41 in the upper rear corner portion 35d of the first bag body 35.

In addition, in the second bag body 36, a pair of second flow channels 42 is provided on the upper side of the first flow channel 41. The second flow channel 42 on the right side communicates with the first flow channel 41 in a lower right corner portion 36f of the second bag body 36. The second flow channel 42 on the left side communicates with the first flow channel 41 in a lower left corner portion 36g of the second bag body 36.

Moreover, in the third bag body 37, the second flow channel 42 is provided on the upper side and the lower side of the first flow channel 41. The second flow channel 42 on the upper side communicates with the first flow channel 41 in the lower front corner portion 37d of the third bag body 37. The second flow channel 42 on the lower side communicates with the first flow channel 41 in the upper rear corner portion 37e of the third bag body 37.

Gas is injected into the first flow channel 41 and the plurality of second flow channels 42 from the inflator 32. Thus, gas is supplied to (fills) the entire region of the first bag body 35, the second bag body 36, and the third bag body 37. Accordingly, the airbag's bag body 31 can be caused to inflate to be spread throughout the entire region.

Next, an example of restraining and protecting the upper half 22a of the body of the occupant 22 by causing the airbag's bag body 31 of the airbag apparatus 20 to inflate to be spread will be described on the basis of FIGS. 2 and 4.

Figure 4:
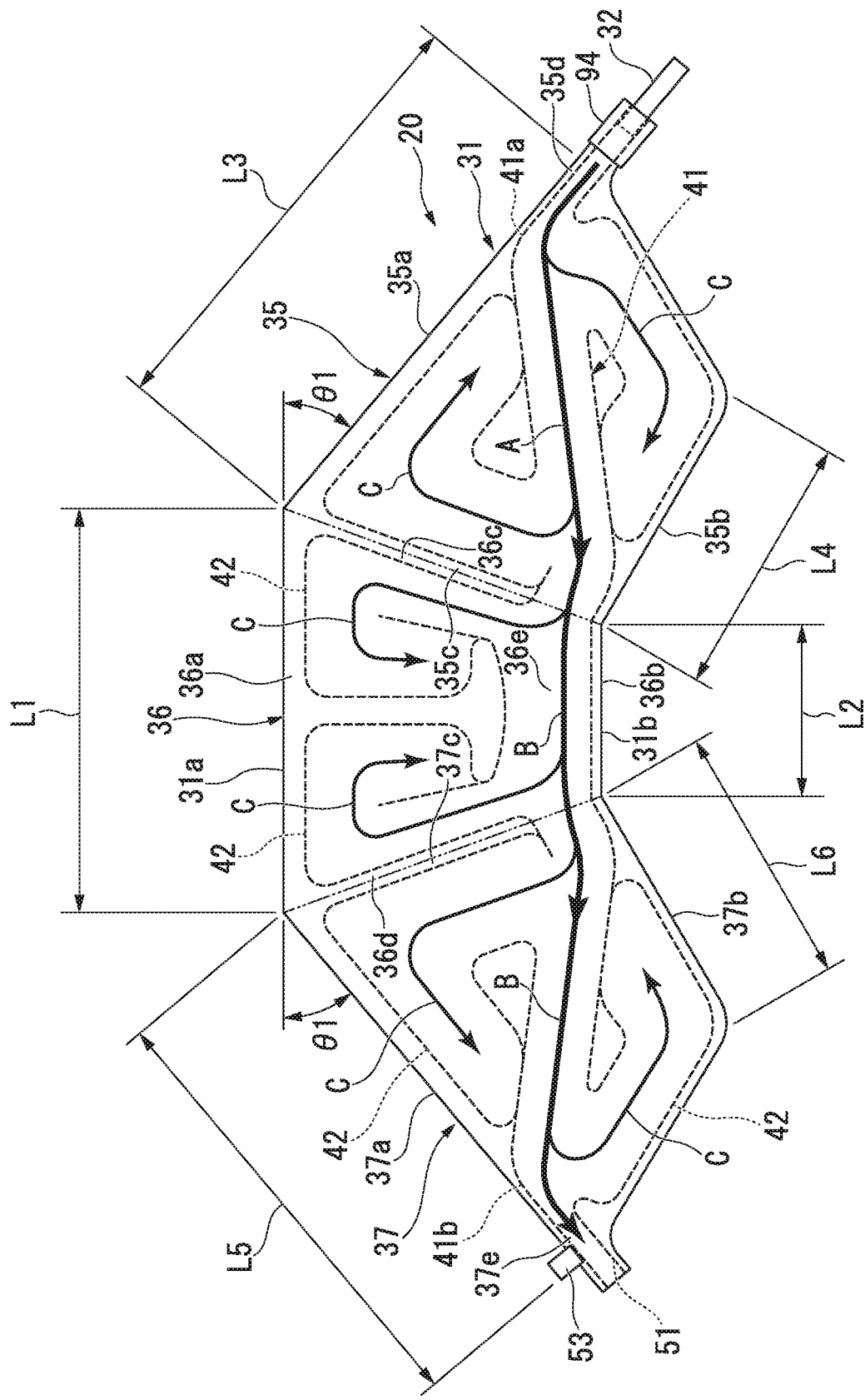
FIG. 4 is a plan view illustrating an example of injecting gas from an inflator to the airbag's bag body according to the first embodiment of the present invention.

As illustrated in FIGS. 2 and 4, if an impact load is input to the vehicle 10, the inflator 32 operates and generates gas. The generated gas flows into the first flow channel 41, as indicated with an arrow A. The gas that has flowed into the first flow channel 41 is guided to the upper rear corner portion 37e of the third bag body through the first flow channel 41, as indicated with an arrow B. Moreover, the gas that has flowed into the first flow channel 41 is guided to the plurality of second flow channels 42, as indicated with an arrow C.

Thus, each of the first bag body 35, the second bag body 36, and the third bag body 37 inflates to be spread in a trapezoidal shape. That is, the second bag body 36 is formed in a trapezoidal shape such that the length dimension L2 of the lower end 36b is smaller than the length dimension L1 of the upper end 36a. In addition, the front end 35c of the first bag body 35 is integrally formed with the right end 36c of the second bag body 36. Thus, the first bag body 35 is disposed in a state in which the lower end (the lower portion) 35b is further attracted to the upper half 22a side of the body of the occupant 22 (that is, the inner side in the vehicle width direction) than the upper end (the upper portion) 35a.

In addition, the front end 37c of the third bag body 37 is integrally formed with the left end 36d of the second bag body 36. Thus, the third bag body 37 is disposed in a state in which the lower end (the lower portion) 37b is further attracted to the upper half 22a side of the body of the occupant 22 (that is, the outer side in the vehicle width direction) than the upper end (the upper portion) 37a.

Moreover, the first bag body 35 is formed in a trapezoidal shape such that the length dimension L4 of the lower end 35b is smaller than the length dimension L3 of the upper end 35a. In addition, in the first bag body 35, the upper end 35a is inclined on a downward gradient at the angle θ1 with respect to the upper end 36a of the second bag body 36.

Similarly, the third bag body 37 is formed in a trapezoidal shape such that the length dimension L6 of the lower end 37b is smaller than the length dimension L5 of the upper end 37a. In the third bag body 37, the upper end 35a is inclined on a downward gradient at the angle θ1 with respect to the upper end 36a of the second bag body 36.

Thus, the second bag body 36 is disposed in a state in which the lower end 36b (the lower portion 36e) is further attracted to the upper half 22a side of the body of the occupant 22 (that is, the rear side of the vehicle body) than the upper end (the upper portion) 36a.

In a state in which the first bag body 35, the second bag body 36, and the third bag body 37 have inflated to be spread, the lower portion of each of the bag bodies 35, 36, and 37 is disposed in a tapered shape being further attracted to the upper half 22a side of the body of the occupant 22 than the upper ends 35a, 36a, and 37a. The lower portion of each of the bag bodies 35, 36, and 37 is a region in the vicinity of the lower end including the lower ends 35b, 36b, and 37b.

In other words, the first bag body 35, the second bag body 36, and the third bag body 37 inflate to be spread in an inclined shape in a manner of approaching the upper half 22a of the body of the occupant 22 toward the lower ends 35b, 36b, and 37b from the upper ends 35a, 36a, and 37a.

Accordingly, the second bag body 36 can restrain the front part of the upper half 22a of the body of the occupant 22. In addition, the first bag body 35 can restrain the part of the upper half 22a of the body of the occupant 22 on the right side. Moreover, the third bag body 37 can restrain the part of the upper half 22a of the body of the occupant 22 on the left side. That is, the upper half 22a of the body of the occupant 22 can be favorably restrained by the first to third bag bodies 35 to 37 in all directions to the front side of the vehicle body, the outer side in the vehicle width direction, and the inner side in the vehicle width direction. As a result, the upper half 22a of the body of the occupant 22 can be suitably protected in all directions.

Here, the part of the first flow channel 41 on the right side is formed downward to the second bag body 36 from the first bag body 35. In addition, the middle part of the first flow channel 41 extending to the second bag body 36 is formed along the lower portion 36e of the second bag body 36. Moreover, the part of the first flow channel 41 on the left side extending along the lower portion 36e of the second bag body 36 is formed upward to the third bag body 37 from the lower portion 36e of the second bag body 36.

Thus, the first flow channel 41 can be continuously constituted as one gas flow channel to the third bag body 37 from the first bag body 35 through the second bag body 36. That is, one first flow channel 41 can be continuously constituted from the end portion (that is, the upper rear corner portion) 35d of the airbag's bag body 31 on the inflator 32 side to the end portion (that is, the upper left corner portion) 37e on a side opposite to the inflator 32.

Accordingly, if the continuously constituted first flow channel 41 is filled with gas from the inflator 32, the first flow channel 41 filled with gas generates a tensile force (reaction force) for attracting the lower ends 35b, 36b, and 37b of the airbag's bag body 31 to the inner side (that is, the upper half 22a side of the body of the occupant 22).

As a result, in all directions including forward in the vehicle body, outward in the vehicle width direction, and inward in the vehicle width direction with respect to the upper half 22a of the body of the occupant 22, the upper half 22a of the body of the occupant 22 can be favorably restrained by the first to third bag bodies 35 to 37 (particularly, the lower portion of each of the bag bodies 35 to 37).

Here, in a spread state of the airbag's bag body 31 caused to inflate to be spread in a plan view, the first flow channel 41 linearly extends to the upper rear corner portion 37e of the third bag body 37 from the upper rear corner portion 35d of the first bag body 35 through the lower end 36b of the second bag body 36.

In addition, the leading end portion 41a of the first flow channel 41 is coupled to the roof rail on the right side (that is, the vehicle body) via the upper rear corner portion 35d of the first bag body 35. In addition, the trailing end portion 41b of the first flow channel 41 is coupled to the vehicle body via the upper rear corner portion 37e of the third bag body 37.

Thus, the first flow channel 41 filled with gas can more suitably generate a tensile force for attracting the lower ends 35b, 36b, and 37b of the airbag's bag body 31 to the inner side (that is, the upper half 22a side of the body of the occupant 22). Accordingly, the upper half 22a of the body of the occupant 22 can be more favorably restrained by the first bag body 35, the second bag body 36, and the third bag body 37.

In addition, according to the airbag's bag body 31, the upper half 22a of the body of the occupant 22 can be restrained by the airbag's bag body 31 which generates a sufficient reaction force alone without depending on other components such as the instrument panel 12 and the steering wheel 16. Furthermore, the airbag's bag body 31 can restrain the upper half 22a of the body of the occupant 22 alone in all directions including forward in the vehicle body, outward in the vehicle width direction, and inward in the vehicle width direction. Accordingly, the degree of freedom in design of other components such as the instrument panel 12 and the steering wheel 16 can be enhanced.

As illustrated in FIG. 5, for example, in the airbag's bag body 31, the first bag body 35 and the third bag body 37 are coupled to the vehicle body (the roof or the like) via the energy absorbing unit 33. The energy absorbing unit 33 includes a plurality of energy absorbing portions 71 to 76. In a first embodiment, first to sixth energy absorbing portions 71 to 76 will be described as an example of the plurality of energy absorbing portions 71 to 76. However, the number of energy absorbing portions can be selected in any desired manner.

In the first to sixth energy absorbing portions 71 to 76, the first energy absorbing portion 71 is coupled to an upper front corner portion 35*f* in the upper end 35*a* of the first bag body 35. The second energy absorbing portion 72 is coupled to an upper middle portion 35*g* in the upper end 35*a* of the first bag body 35. The third energy absorbing portion 73 is coupled to the upper rear corner portion 35*d* in the upper end 35*a* of the first bag body 35.

In addition, the fourth energy absorbing portion 74 is coupled to an upper front corner portion 37*f* in the upper end 37*a* of the third bag body 37. The fifth energy absorbing portion 75 is coupled to an upper middle portion 37*g* in the upper end 37*a* of the third bag body 37. The sixth energy absorbing portion 76 is coupled to the upper rear corner portion 37*e* in the upper end 37*a* of the third bag body 37.

The first to sixth energy absorbing portions 71 to 76 have configurations similar to each other. Hereinafter, the first energy absorbing portion 71 will be described in detail as the "energy absorbing portion 71", and detailed description of the second to sixth energy absorbing portions 72 to 76 will be omitted.

Figure 6:
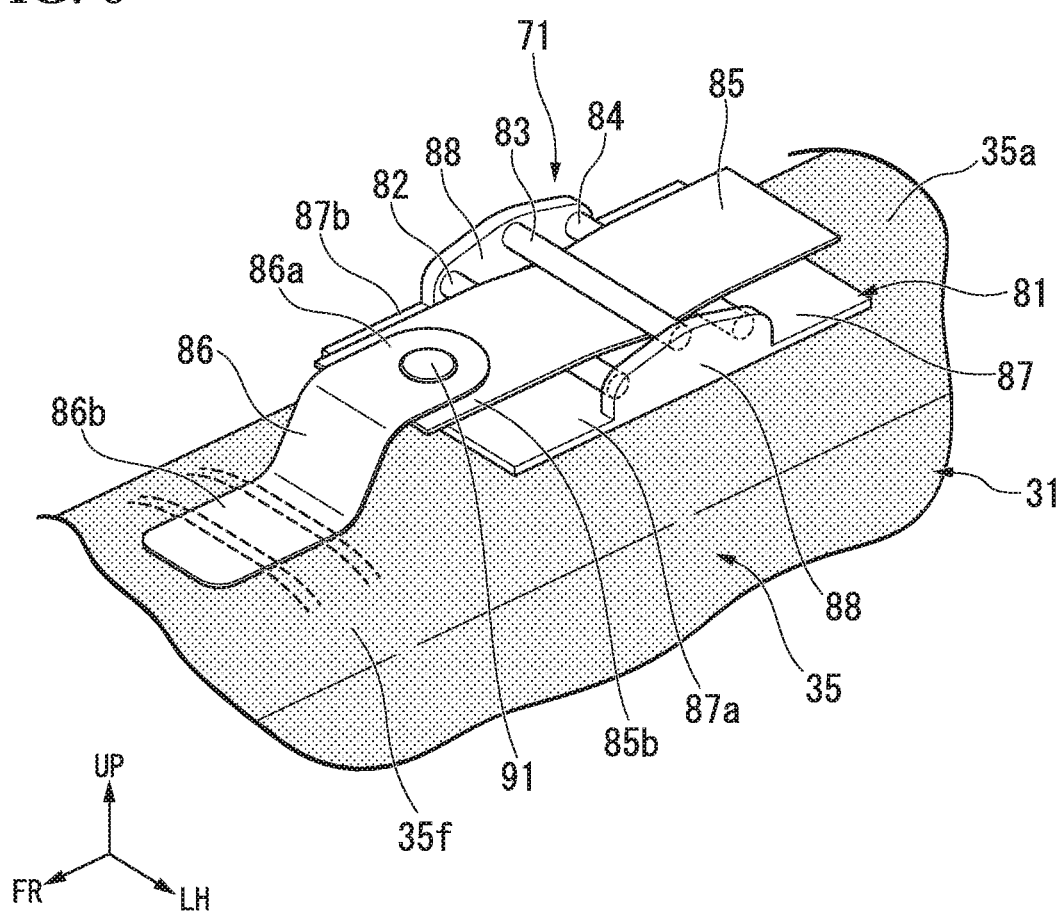
FIG. 6 is a perspective view illustrating an energy absorbing portion of the airbag apparatus according to the first embodiment of the present invention.
Figure 7:
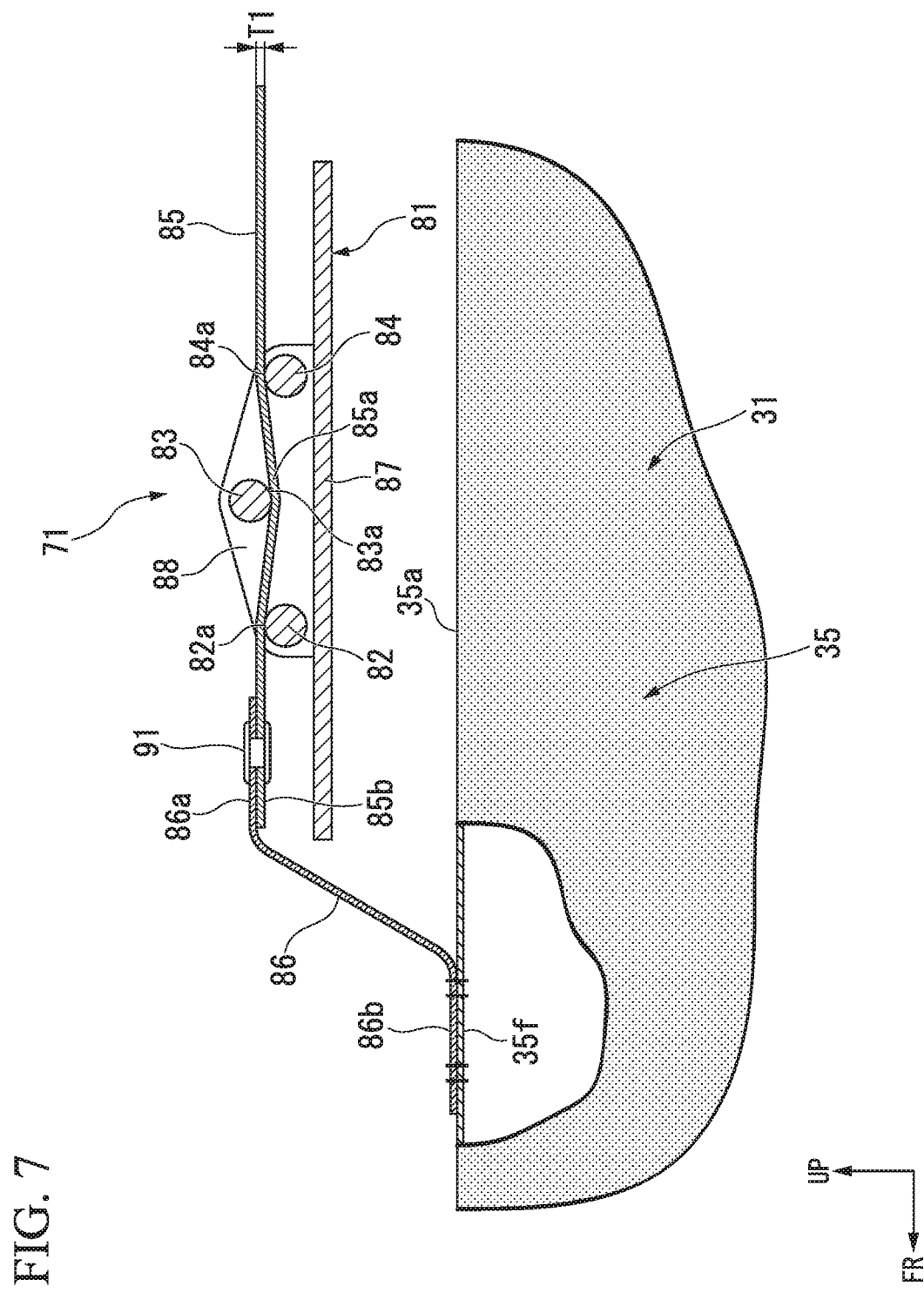
FIG. 7 is a cross-sectional view illustrating the energy absorbing portion of the airbag apparatus according to the first embodiment of the present invention.

As illustrated in FIGS. 6 and 7, for example, the energy absorbing portion 71 includes a supporting bracket 81, first to third supporting rods 82 to 84, an absorption plate (a plate-shaped member) 85, and a coupling tether (a coupling strap) 86.

The supporting bracket 81 includes an attachment plate 87 and a pair of support portions 88. For example, the attachment plate 87 is formed in a rectangular shape and is attached to the vehicle body (the roof or the like).

The pair of support portions 88 is fixed to middle parts 87*a* and 87*b* of both side portions of the attachment plate 87 with a space therebetween. The first to third supporting rods 82 to 84 are supported between the pair of support portions 88.

Both end portions of the first to third supporting rods 82 to 84 are attached to the pair of support portions 88 and are disposed with a space therebetween in a longitudinal direction of the attachment plate 87. Specifically, the first supporting rod 82 and the third supporting rod 84 are disposed with a space therebetween in the longitudinal direction of the attachment plate 87 with a uniform space with respect to the attachment plate 87. The second supporting rod 83 is disposed between the first supporting rod 82 and the third supporting rod 84.

A bottom portion 83*a* of the second supporting rod 83 is disposed on the attachment plate 87 side of each of apex portions 82*a* and 84*a* of the first supporting rod 82 and the third supporting rod 84. Each of the apex portions 82*a* and 84*a* of the first supporting rod 82 and the third supporting rod 84 is a part positioned on a side opposite to the attachment plate 87. The bottom portion 83*a* of the second supporting rod 83 is a part positioned on the attachment plate 87 side.

The absorption plate 85 is supported in a manner of coming into contact with the apex portion 82*a* of the first supporting rod 82, the bottom portion 83*a* of the second supporting rod 83, and the apex portion 84*a* of the third supporting rod 84. The absorption plate 85 is formed of a steel plate or a resin plate, for example, in a rectangular belt shape and has a uniform plate thickness dimension T1. The absorption plate 85 is supported in a manner of coming into contact with the apex portion 82*a* of the first supporting rod 82, the bottom portion 83*a* of the second supporting rod 83, and the apex portion 84*a* of the third supporting rod 84. Accordingly, a substantially middle portion 85*a* of the absorption plate 85 is folded in a V-shape toward the attachment plate 87 side by the bottom portion 83*a* of the second supporting rod 83.

A distal end portion 86*a* of the coupling tether 86 is coupled to a distal end portion 85*b* of the absorption plate 85 by a binding member 91. A proximal end portion 86*b* of the coupling tether 86 is coupled to the upper front corner portion 35*f* of the first bag body 35 by being stitched (sutured) thereto.

Incidentally, it is assumed that the first bag body 35 is disposed along a roof side rail of the vehicle in a state in which the airbag's bag body 31 is accommodated (refer to FIG. 1). Here, for example, it is assumed that a joint flange of the roof side rail bulges out along the roof side rail. Therefore, it is assumed that the airbag's bag body 31 comes into contact with the joint flange in a state in which the airbag's bag body 31 is disposed along the roof side rail.

Therefore, in a state in which the first bag body 35 is folded in an accommodated state, the first bag body 35 in an accommodated state is disposed on the upper side of the energy absorbing portion 71. In other words, the airbag's bag body 31 is supported above the absorption plate 85 in an accommodated state.

Thus, the absorption plate 85 can prevent the airbag's bag body 31 from coming into contact with the joint flange. Accordingly, the airbag's bag body 31 can be protected from the joint flange, so that the quality of the airbag's bag body 31 can be further enhanced.

That is, the absorption plate 85 also plays a role as a protector for protecting the airbag's bag body 31.

Figure 8:
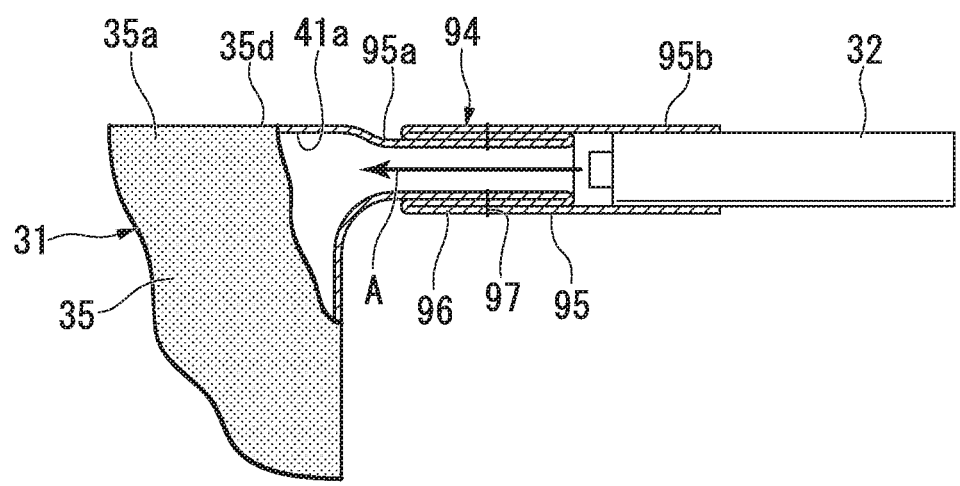
FIG. 8 is a cross-sectional view illustrating a communication state between the airbag's bag body and the inflator according to the first embodiment of the present invention.

As illustrated in FIG. 8, the inflator 32 communicates with the upper rear corner portion 35*d* of the upper end 35*a* of the first bag body 35 via a communication portion 94. For example, the inflator 32 is attached to the roof rail on the right side (that is, the vehicle body).

In the communication portion 94, a proximal end portion 95*a* of the peripheral wall 95 is coupled to the leading end portion 41*a* of the first flow channel 41 (refer to FIG. 3) in the upper rear corner portion 35*d*. The peripheral wall 95 is formed in a hollow shape, and a folded part 96 is folded in an overlapping state. The overlapped folded part 96 is sutured at a stitched portion 97.

Thus, the peripheral wall 95 of the communication portion 94 is contracted in an overlapping state, and the contracted communication portion 94 is retained in a hollow shape. The inflator 32 communicates with a distal end portion 95*b* of the peripheral wall 95. In addition, in the communication portion 94, if the stitched portion 97 of the folded part 96 is released (ruptured), the folded part 96 can be extended. That is, the communication portion 94 is formed to be stretchable.

When gas is supplied to the first flow channel 41 of the airbag's bag body 31 through the inflator 32, gas can be smoothly supplied to the airbag's bag body 31 from the communication portion 94. Accordingly, the airbag's bag body 31 can be caused to inflate to be spread.

Next, an example of the first to sixth energy absorbing portions 71 to 76 absorbing the impact energy acting on the upper half 22*a* of the body of the occupant 22 will be described on the basis of FIGS. 4 and 8 to 12.

As illustrated in FIGS. 8 and 4, if an impact load is input to the vehicle 10 (refer to FIG. 1), the inflator 32 operates and generates gas. The generated gas flows into the first flow channel 41 through the communication portion 94, as indicated with the arrow A. The gas that has flowed into the first flow channel 41 is guided to the upper rear corner portion 37e of the third bag body through the first flow channel 41, as indicated with the arrow B. Moreover, the gas that has flowed into the first flow channel 41 is guided to the plurality of second flow channels 42, as indicated with the arrow C.

Figure 9:
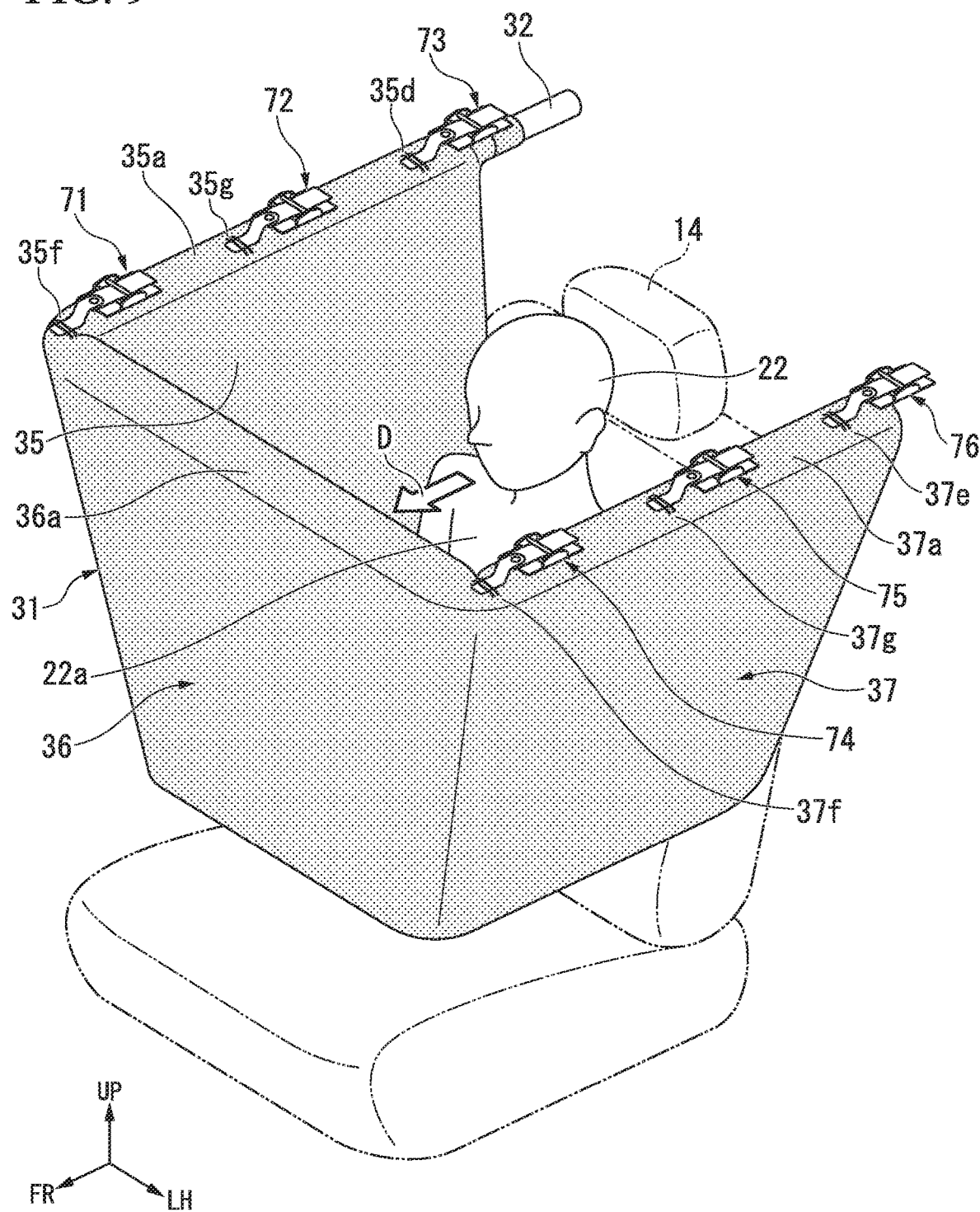
FIG. 9 is a perspective view describing an example of restraining an occupant by causing the airbag's bag body according to the first embodiment of the present invention to inflate to be spread.

As illustrated in FIG. 9, in a state in which the first bag body 35, the second bag body 36, and the third bag body 37 (that is, the airbag's bag body 31) inflate to be spread, the front side and both sides of the upper half 22a of the body of the occupant 22 are surrounded with the airbag's bag body 31. In this state, the lower portion of each of the bag bodies 35, 36, and 37 is disposed in a tapered shape being further attracted to the upper half 22a side of the body of the occupant 22 than the upper ends 35a, 36a, and 37a.

The upper half 22a of the body of the occupant 22 moves toward the second bag body 36 on the front side of the vehicle body as indicated with an arrow D and is restrained by the airbag's bag body 31.

Here, the first energy absorbing portion 71 is coupled to the upper front corner portion 35f of the first bag body 35. In addition, the second energy absorbing portion 72 is coupled to the upper middle portion 35g of the first bag body 35. Moreover, the third energy absorbing portion 73 is coupled to the upper rear corner portion 35d of the first bag body 35.

On the other hand, the fourth energy absorbing portion 74 is coupled to the upper front corner portion 37f of the third bag body 37. In addition, the fifth energy absorbing portion 75 is coupled to the upper middle portion 37g of the third bag body 37. Moreover, the sixth energy absorbing portion 76 is coupled to the upper rear corner portion 37e of the third bag body 37.

Figure 10:
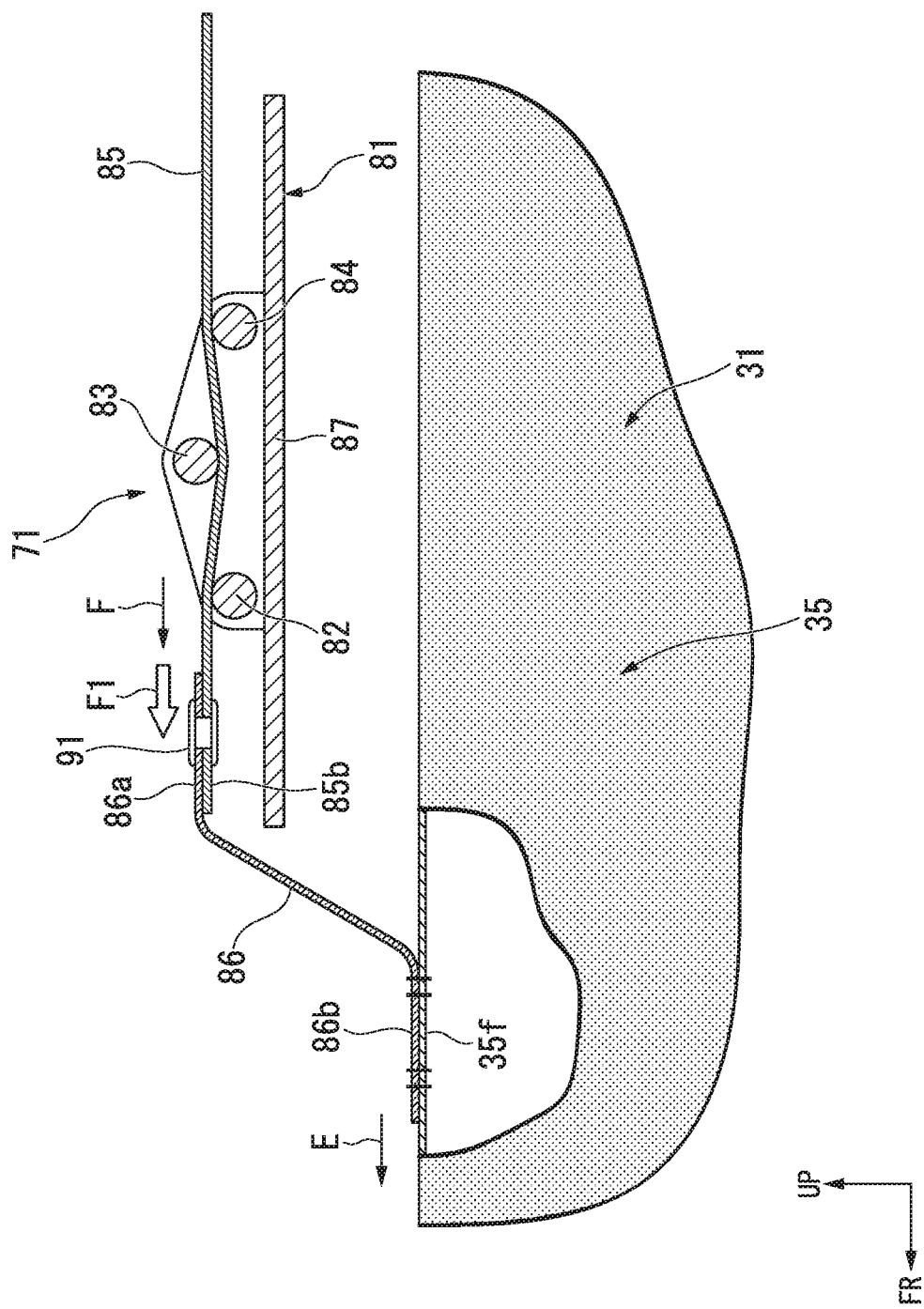
FIG. 10 is a cross-sectional view describing an example of generating a load reaction force in the airbag's bag body according to the first embodiment of the present invention and allowing the airbag's bag body to move.

As illustrated in FIG. 10, the distal end portion 85b of the absorption plate 85 is coupled to the upper front corner portion 35f of the airbag's bag body 31 via the coupling tether 86 and the binding member 91. In this state, when the upper half 22a of the body of the occupant 22 is restrained, the upper front corner portion 35f of the airbag's bag body 31 moves in an arrow E direction. Thus, a load F1 is input to the distal end portion 85b of the absorption plate 85, and the absorption plate 85 is pulled in an arrow F direction. Here, the absorption plate 85 is supported by the first to third supporting rods 82 to 84 in a state of being folded in a V-shape.

Thus, if the absorption plate 85 is pulled by the load F1, the absorption plate 85 moves in the arrow F direction while being deformed in a manner of being squeezed by the first to third supporting rods 82 to 84. Accordingly, a load reaction force is generated in the upper front corner portion 35f (that is, the airbag's bag body 31), and the airbag's bag body 31 can be allowed to move in the arrow E direction.

Figure 11:
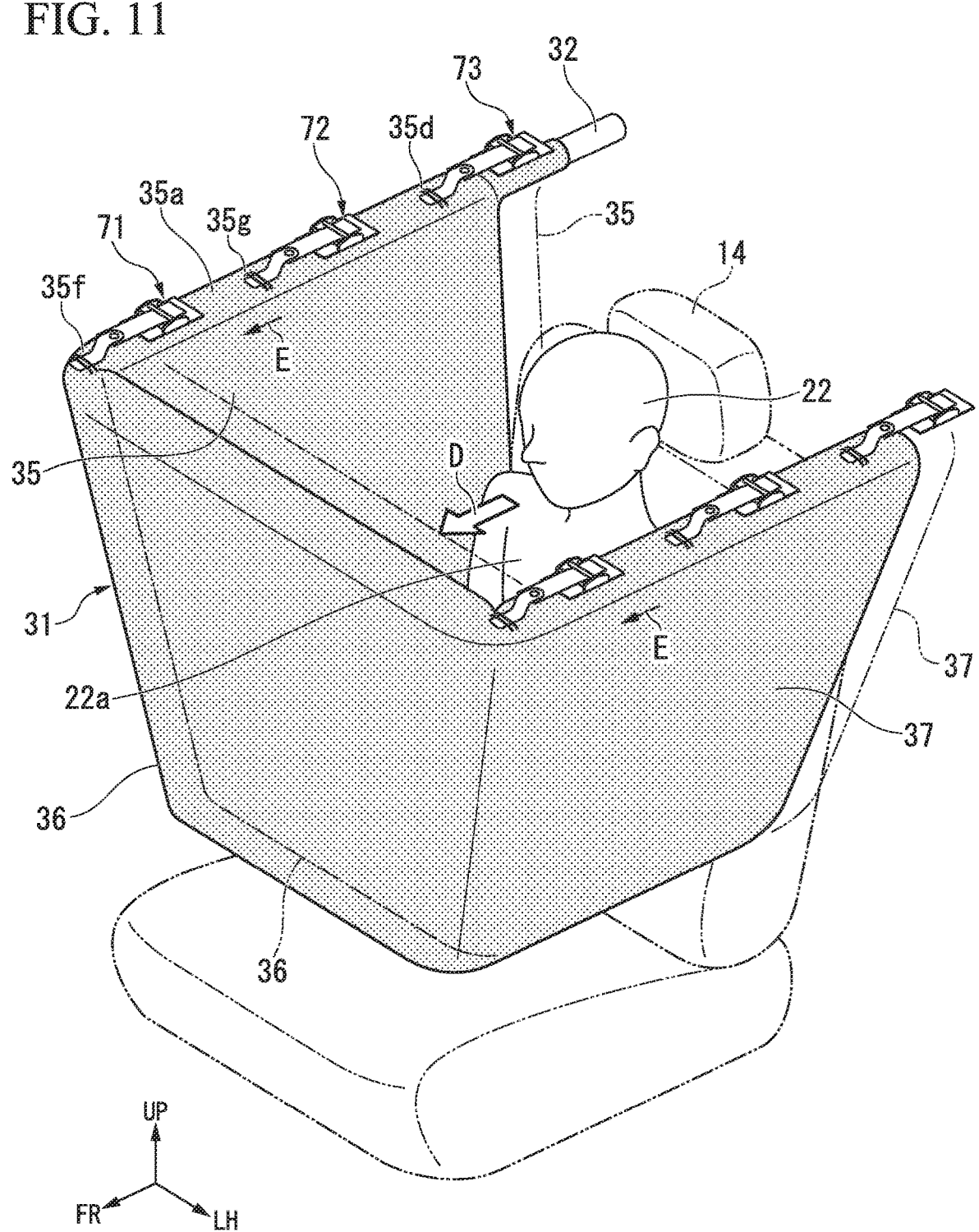
FIG. 11 is a perspective view describing an example of the airbag apparatus according to the first embodiment of the present invention absorbing impact energy acting on an occupant.

As illustrated in FIG. 11, a load reaction force is generated in the airbag's bag body 31 by the first to sixth energy absorbing portions 71 to 76, and the airbag's bag body 31 can be allowed to move in the arrow E direction.

In this manner, if the airbag's bag body 31 is moved as indicated with the arrow E, while being supported by a load reaction force, the impact energy acting on the upper half 22a of the body of the occupant 22 can be suitably absorbed by performing mechanical control.

Figure 12:
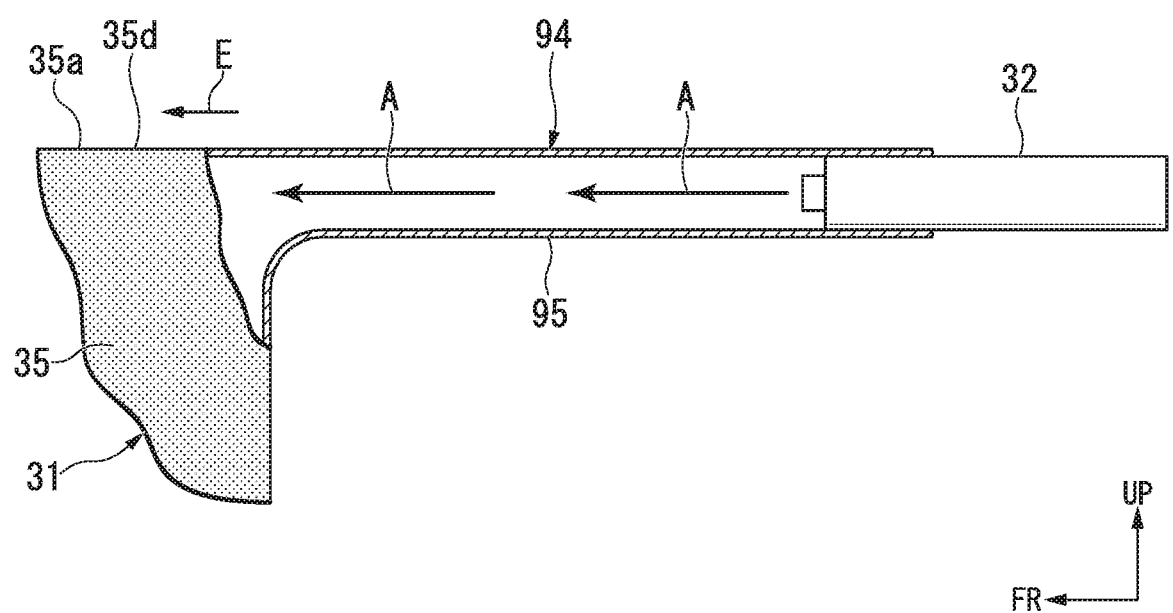
FIG. 12 is a cross-sectional view describing an example of extending a communication portion in a manner of following the airbag's bag body according to the first embodiment of the present invention.

As illustrated in FIG. 12, when the airbag's bag body 31 moves as indicated with the arrow E, the stitched portion 97 (refer to FIG. 8) of the communication portion 94 is ruptured. Thus, the folded part 96 (refer to FIG. 8) can be extended in a manner of following the movement of the airbag's bag body 31. That is, the airbag's bag body 31 can be smoothly moved in the arrow E direction.

Returning to FIG. 11, in a state in which the first bag body 35, the second bag body 36, and the third bag body 37 (that is, the airbag's bag body 31) inflate to be spread, the front side and both sides of the upper half 22a of the body of the occupant 22 can be surrounded with the airbag's bag body 31. Thus, in all directions including forward in the vehicle body, outward in the vehicle width direction, and inward in the vehicle width direction with respect to the upper half 22a of the body of the occupant 22, the upper half 22a of the body of the occupant 22 can be restrained by each of the bag bodies 35 to 37.

In a state in which the upper half 22a of the body of the occupant 22 is restrained by each of the bag bodies 35 to 37, if the airbag's bag body 31 is moved in the arrow E direction while a load reaction force is applied to the airbag's bag body 31, the upper half 22a of the body of the occupant 22 can be suitably protected in all directions.

Moreover, in the airbag's bag body 31, there is no need to form a vent hole (an opening portion) for discharging gas in the airbag's bag body 31, in order to absorb impact energy. Accordingly, the upper half 22a of the body of the occupant 22 can be suitably restrained without causing the timing of restraining the upper half 22a of the body of the occupant 22 and the direction of restraining the upper half 22a of the body of the occupant 22 to be regulated by the vent hole.

In addition, since there is no need to form a vent hole in the airbag's bag body 31, a structure for absorbing impact energy (that is, the energy absorbing portion 71) can be simplified, and cost reduction or weight reduction of the airbag apparatus 20 can be realized.

Moreover, the first to sixth energy absorbing portions 71 to 76 are configured to absorb impact energy by performing mechanical control in which the airbag's bag body 31 is moved while being supported by a load reaction force, instead of being configured to absorb impact energy by discharging gas through the vent hole of the airbag's bag body 31.

Accordingly, the impact energy acting on the upper half 22a of the body of the occupant 22 can be stably absorbed by performing mechanical control of the first to sixth energy absorbing portions 71 to 76.

Next, a first modification example and a second modification example of the energy absorbing portion 71 of the first embodiment will be described on the basis of FIGS. 13 and 14. In the first modification example and the second modification example, the same reference signs are applied to configurations which are the same as or similar to those of the energy absorbing portion 71 of the first embodiment, and detailed description thereof will be omitted.

First, as the first modification example of the first embodiment, an energy absorbing portion 110 will be described on the basis of FIG. 13.

First Modification Example

Figure 13:
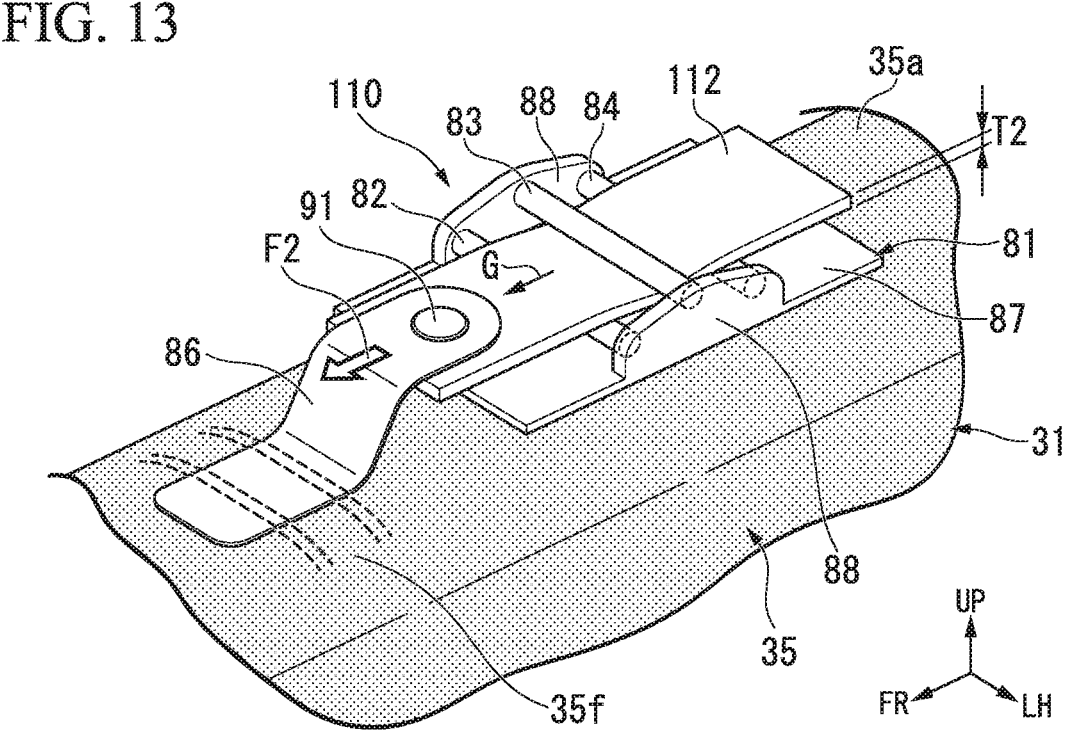
FIG. 13 is a perspective view illustrating a first modification example according to the first embodiment of the present invention.

As illustrated in FIG. 13, in the energy absorbing portion 110, the absorption plate 85 of the first embodiment is substituted with an absorption plate (a plate-shaped member) 112, and other configurations are similar to those of the absorption plate 85 of the first embodiment.

In the absorption plate 112, a plate thickness dimension T2 is set to be larger than the plate thickness dimension T1 of the absorption plate 85 of the first embodiment. In the absorption plate 112, similar to the absorption plate 85 of the first embodiment, a substantially middle portion 112a is folded in a V-shape toward the attachment plate 87 side by the first to third supporting rods 82 to 84.

If the absorption plate 112 is pulled by a load F2, the absorption plate 112 moves in an arrow G direction while being deformed in a manner of being squeezed by the first to third supporting rods 82 to 84. Here, the plate thickness dimension T2 of the absorption plate 112 is set to be larger than the plate thickness dimension T1 of the absorption plate 85 of the first embodiment. Thus, if the absorption plate 85 is deformed in a manner of being squeezed a load reaction force greater than that in the first embodiment can be generated in the airbag's bag body 31.

Accordingly, if the airbag's bag body 31 is moved as indicated with an arrow G, while being supported by a load reaction force greater than that in the first embodiment, the impact energy acting on the upper half 22a of the body of the occupant 22 can be suitably absorbed by performing mechanical control.

In this manner, if the plate thickness dimensions T1 and T2 of the absorption plates 85 and 112 are changed, a load reaction force can be changed to be increased in multiple stages from an early restraint period to a later restraint period. Accordingly, the usage of the energy absorbing portion 110 can be further expanded.

Next, as the second modification example of the first embodiment, an energy absorbing portion 115 will be described on the basis of FIG. 14.

Second Modification Example

Figure 14:
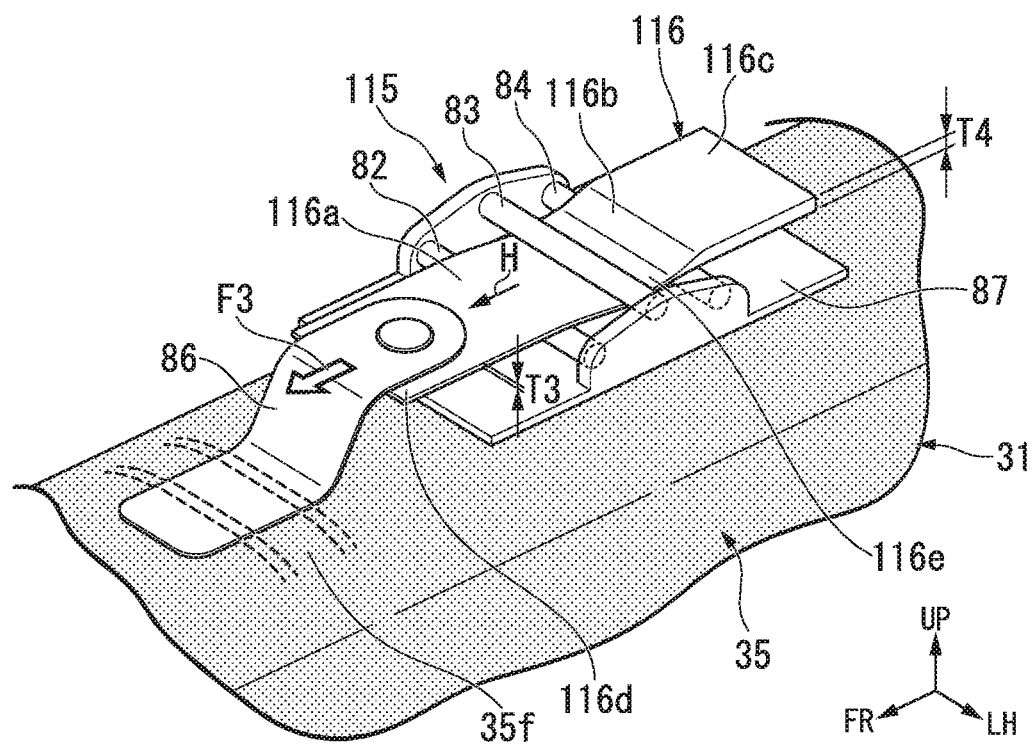
FIG. 14 is a perspective view illustrating a second modification example according to the first embodiment of the present invention.

As illustrated in FIG. 14, in the energy absorbing portion 115, the absorption plate 85 of the first embodiment is substituted with an absorption plate (a plate-shaped member) 116, and other configurations are similar to those of the absorption plate 85 of the first embodiment.

The absorption plate 116 has a first region 116a, a second region 116b, and a third region 116c. The first region 116a is a region from a distal end portion 116d to a middle portion 116e in the absorption plate 116. The first region 116a is formed to be flat with a uniform plate thickness dimension T3.

The third region 116c is a region on the other end portion 116f side. The third region 116c is formed to be flat with a uniform plate thickness dimension T4. The plate thickness dimension T4 of the third region 116c is set to be larger than the plate thickness dimension T3 of the first region 116a. The second region 116b is formed in an inclined shape from the first region 116a to the third region 116c.

In the absorption plate 116, similar to the absorption plate 85 of the first embodiment, the first region 116a is folded in a V-shape toward the attachment plate 87 side by the first to third supporting rods 82 to 84.

If the absorption plate 116 is pulled by a load F3, the absorption plate 116 moves in an arrow H direction while being deformed. Here, the plate thickness dimension of the absorption plate 116 is set to be large in the first region 116a, the second region 116b, and the third region 116c. Thus, if the absorption plate 116 is deformed in a manner of being squeezed by the first to third supporting rods 82 to 84 in the order of the first region 116a, the second region 116b, and the third region 116c, a large load reaction force can be generated in stages in the airbag's bag body 31.

That is, a load reaction force restraining the upper half 22a of the body of the occupant 22 (refer to FIG. 11) can be increased in multiple stages from the early restraint period to the later restraint period. Thus, a load reaction force acting on the upper half 22a of the body of the occupant 22 can become larger during the later restraint period than the early restraint period in accordance with the state of the upper half 22a of the body of the occupant 22. Accordingly, an excessively large load reaction force is inhibited from acting on the upper half 22a of the body of the occupant 22 during the early restraint period, and a relatively large load reaction force can be caused to act on the upper half 22a of the body of the occupant 22 during the later restraint period. Therefore, the upper half 22a of the body of the occupant 22 is suitably restrained, and the impact energy acting on the upper half 22a of the body of the occupant 22 can be suitably absorbed by performing mechanical control.

According to the energy absorbing portions 71, 110, and 115 of the first embodiment, the first modification example, and the second modification example, if the plate thickness dimensions T1, T2, T3, and T4 of the absorption plates 85, 112, and 116 are changed, a load reaction force can be suitably adjusted. Accordingly, the usage of the energy absorbing portions 71, 110, and 115 can be further expanded.

In this manner, the energy absorbing portions 71, 110, and 115 of the first embodiment, the first modification example, and the second modification example are configured to absorb impact energy by performing mechanical control. Thus, impact energy can be absorbed in multiple stages without performing control of the amount of gas to be supplied to the inside of the airbag's bag body 31 from an inflator.

In contrast, according to a configuration in which impact energy is absorbed by discharging gas through the vent hole, when impact energy is absorbed in multiple stages (in stages), there is a need to control the amount of gas to be supplied to the inside of the airbag's bag body from an inflator, so that it is difficult to cope with absorption in multiple stages.

Next, energy absorbing portions 120, 140, 170, 200, and 230 according to a second embodiment to a seventh embodiment will be described on the basis of FIGS. 15 to 29. In the second embodiment to the seventh embodiment, the same reference signs are applied to configurations which are the same as or similar to those of the energy absorbing portion 71 of the first embodiment, and detailed description thereof will be omitted.

Second Embodiment

Figure 15:
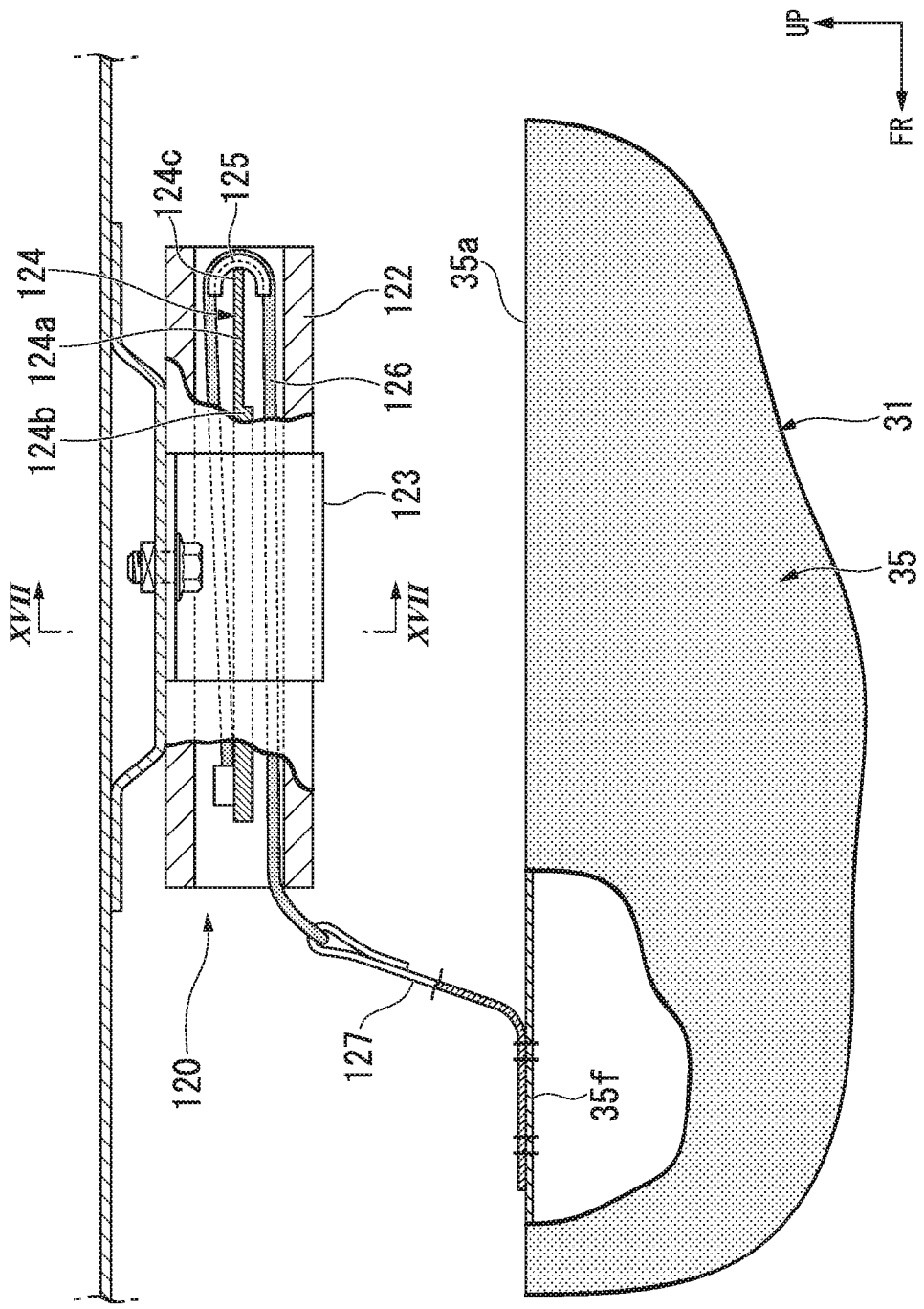
FIG. 15 is a cross-sectional view illustrating an energy absorbing portion according to a second embodiment of the present invention.
Figure 16:
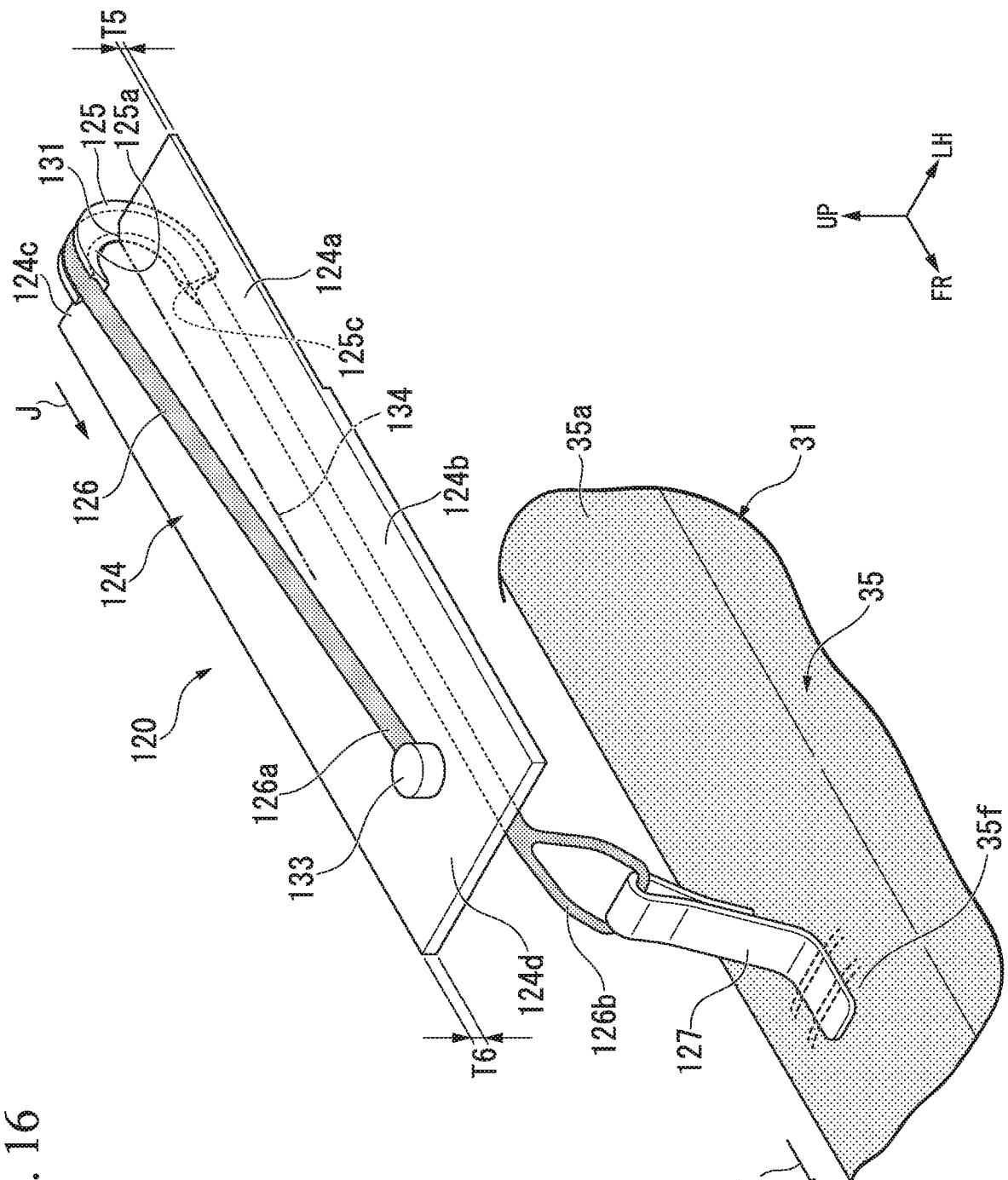
FIG. 16 is a perspective view illustrating the energy absorbing portion according to the second embodiment of the present invention.
Figure 17:
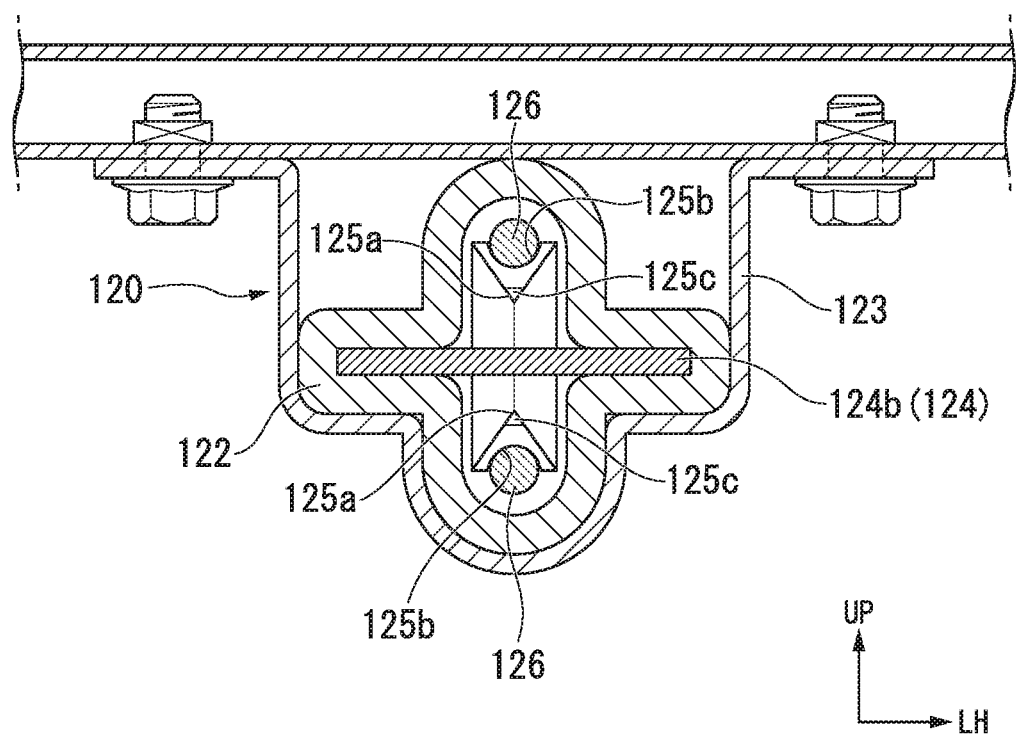
FIG. 17 is a cross-sectional view of the energy absorbing portion according to the second embodiment of the present invention taken along line XVII-XVII in FIG. 15.

As illustrated in FIGS. 15 to 17, for example, the energy absorbing portion 120 includes a support member 122, an attachment bracket 123, an absorption plate (a plate-shaped member) 124, a cutter 125, a traction wire 126, and a coupling tether (coupling strap) 127.

For example, the support member 122 is attached along a vehicle body (specifically, a roof) 129 by the attachment bracket 123. Inside the support member 122, the absorption plate 124 is provided along the support member 122. The absorption plate 124 is formed of a steel plate or a resin plate in a rectangular belt shape. For example, in the absorption plate 124, a distal end portion 124a is formed to have a plate thickness dimension T5, and a different part 124b is formed to have a plate thickness dimension T6. The plate thickness dimension T6 of the different part 124b is formed to be larger than the plate thickness dimension T5 of the distal end portion 124a.

A cut-out 131 is formed at a distal end 124c of the distal end portion 124a, and the cutter 125 is disposed in the cut-out 131. The cutter 125 is formed in a semicircular-arc shape in a side view and is formed in a V-shape in a cross section. A blade tip 125a is formed in the inner circumference of the cutter 125, and a guide portion 125b is formed in the outer circumference of the cutter 125. Both end portions 125c of the blade tip 125a are formed in a curved shape.

The traction wire 126 is hung in the guide portion 125b, and a proximal end portion 126a of the traction wire 126 is attached to a proximal end portion 124d of the absorption plate 124 by a fixing member 133. A distal end portion 126b of the traction wire 126 is coupled to the upper front corner portion 35f in the upper end 35a of the first bag body 35 via the coupling tether 127.

In this state, the blade tip 125a of the cutter 125 is brought into contact with the cut-out 131.

Next, an example of generating a load reaction force by the energy absorbing portion 120 of the second embodiment will be described on the basis of FIG. 14. First, in a state in which the airbag's bag body 31 inflates to be spread, the front side and both sides of the upper half 22a of the body of the occupant 22 (refer to FIG. 9) are surrounded with the airbag's bag body 31. In this state, the upper half 22a of the body of the occupant 22 moves toward the second bag body 36 on the front side of the vehicle body and is restrained by the airbag's bag body 31. When the upper half 22a of the body of the occupant 22 is restrained, the upper front corner portion 35f of the airbag's bag body 31 moves in an arrow I direction.

The distal end portion 126b of the traction wire 126 is coupled to the upper front corner portion 35f of the airbag's bag body 31 via the coupling tether 127. Accordingly, the distal end portion 126b of the traction wire 126 is pulled in the arrow I direction due to a pulling input of the upper front corner portion 35f. If the distal end portion 126b of the traction wire 126 is pulled, the cutter 125 moves in an arrow J direction by the traction wire 126. If the cutter 125 moves, the absorption plate 124 is cut by the cutter 125 along a cutting line 134 (indicated with an imaginary line) from the cut-out 131 (that is, the distal end 124c) of the absorption plate 124.

Here, both the end portions 125c of the blade tip 125a are formed in a curved shape. Accordingly, both the end portions 125c of the blade tip 125a can be prevented from intruding into the absorption plate 124.

If the absorption plate 124 is cut from the distal end 124c, a load reaction force can be generated by the energy absorbing portion 120. Accordingly, a load reaction force is generated in the upper front corner portion 35f (that is, the airbag's bag body 31), and the airbag's bag body 31 can be allowed to move in the arrow I direction.

In addition, in the absorption plate 124, the plate thickness dimension T6 of the different part 124b is formed to be larger than the plate thickness dimension T5 of the distal end portion 124a. Thus, a load reaction force restraining the upper half 22a of the body of the occupant 22 (refer to FIG. 9) can be increased in multiple stages from the early restraint period to the later restraint period. Accordingly, an excessively large load reaction force is inhibited from acting on the upper half 22a of the body of the occupant 22 during the early restraint period, and a relatively large load reaction force can be caused to act on the upper half 22a of the body of the occupant 22 during the later restraint period. Therefore, the upper half 22a of the body of the occupant 22 is suitably restrained, and the impact energy acting on the upper half 22a of the body of the occupant 22 can be suitably absorbed by performing mechanical control.

Moreover, according to the energy absorbing portion 120 of the second embodiment, the absorption plate 124 is configured to be cut from the distal end 124c to generate a load reaction force in the airbag's bag body 31. Accordingly, stability of a load reaction force with respect to a change in a direction of a load (that is, a pulling input of the airbag's bag body 31) for cutting the absorption plate 124 is achieved, and the degree of freedom in design can be enhanced.

In addition, according to the energy absorbing portion 120 of the second embodiment, the cutter 125 plays a role of a pulley. Accordingly, a large moving amount of the upper portion (specifically, the upper front corner portion 35f) of the airbag's bag body 31 can be ensured, so that size reduction of the energy absorbing portion 120 can be realized.

Third Embodiment

Figure 18:
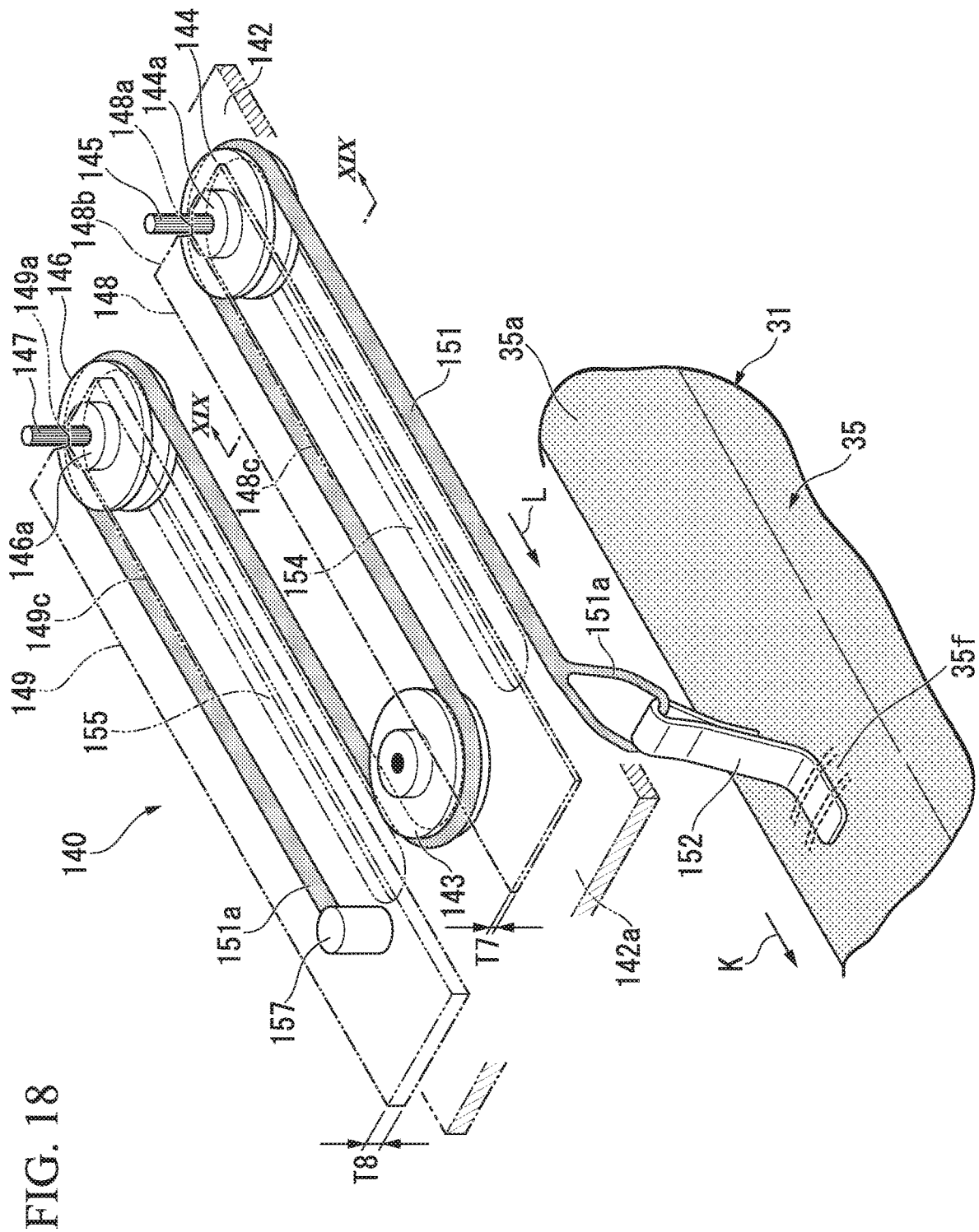
FIG. 18 is a perspective view illustrating an energy absorbing portion according to a third embodiment of the present invention.
Figure 19:
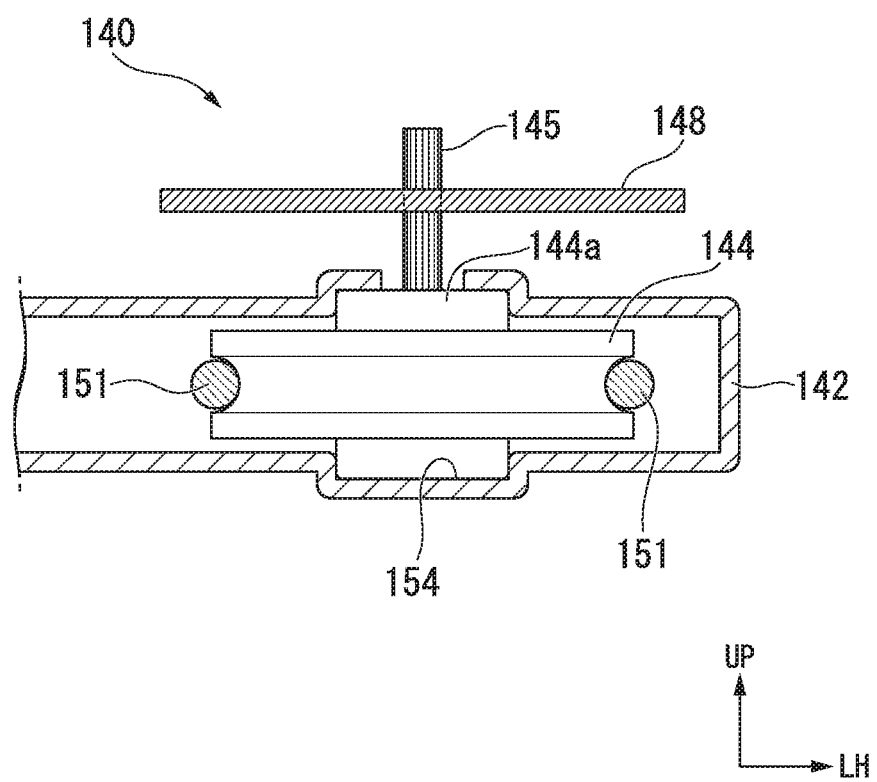
FIG. 19 is a cross-sectional view of the energy absorbing portion according to the third embodiment of the present invention taken along line XIX-XIX in FIG. 18.

As illustrated in FIGS. 18 and 19, for example, an energy absorbing portion 140 includes a support member 142, a fixed pulley 143, a first movable pulley (a pulley) 144, a first cutter 145, a second movable pulley (a pulley) 146, a second cutter 147, a first absorption plate (a plate-shaped member) 148, a second absorption plate (a plate-shaped member) 149, a traction wire 151, and a coupling tether (a coupling strap) 152.

For example, the support member 142 is attached along the vehicle body (specifically, the roof). The fixed pulley 143 is rotatably supported by a front end portion 142a of the support member 142. On the right and left sides of the support member 142 in the vehicle width direction, a first guide portion 154 and a second guide portion 155 are formed to extend in a front-rear direction of the vehicle body.

The first movable pulley 144 is supported to be movable along the first guide portion 154. The first cutter 145 coaxially protrudes upward from an upper end portion 144a of the first movable pulley 144. In addition, the second movable pulley 146 is supported to be movable along the second guide portion 155.

The second cutter 147 coaxially protrudes upward from an upper end portion 146a of the second movable pulley 146.

The traction wire 151 is hung in the first movable pulley 144, the fixed pulley 143, and the second movable pulley 146. A proximal end portion 151a of the traction wire 151 is attached to the support member 142 by a fixing member 157. In addition, a distal end portion 151b of the traction wire 151 is coupled to the upper front corner portion 35f in the upper end 35a of the first bag body 35 via the coupling tether 152.

In this state, the first cutter 145 is brought into contact with a cut-out 148a of the first absorption plate 148. In addition, the second cutter 147 is brought into contact with a cut-out 149a of the second absorption plate 149.

The first absorption plate 148 is disposed along the first guide portion 154. The first absorption plate 148 is formed of a steel plate or a resin plate in a rectangular belt shape. In addition, the second absorption plate 149 is disposed along the second guide portion 155. The second absorption plate 149 is formed of a steel plate or a resin plate in a rectangular belt shape.

Here, a plate thickness dimension T7 of the first absorption plate 148 is set to be smaller than a plate thickness dimension T8 of the second absorption plate 149.

Next, an example of generating a load reaction force by the energy absorbing portion 140 of a third embodiment will be described on the basis of FIG. 18. First, in a state in which the airbag's bag body 31 inflates to be spread, the front side and both sides of the upper half 22a of the body of the occupant 22 (refer to FIG. 9) are surrounded with the airbag's bag body 31. In this state, the upper half 22a of the body of the occupant 22 moves toward the second bag body 36 on the front side of the vehicle body and is restrained by the airbag's bag body 31. When the upper half 22a of the body of the occupant 22 is restrained, the upper front corner portion 35f of the airbag's bag body 31 moves in the arrow F direction.

The distal end portion 151b of the traction wire 151 is coupled to the upper front corner portion 35f of the airbag's bag body 31 via the coupling tether 152. Accordingly, the distal end portion 151b of the traction wire 151 is pulled in an arrow L direction due to a pulling input of the upper front corner portion 35f. If the distal end portion 151b of the traction wire 151 is pulled, the first cutter 145 moves together with the first movable pulley 144 in the arrow L direction by the traction wire 151.

If the first cutter 145 moves, the first absorption plate 148 is cut by the first cutter 145 along a cutting line 148c (indicated with an imaginary line) from the cut-out 148a (that is, a distal end 148b) of the first absorption plate 148.

In a state in which movement of the first movable pulley 144 is completed, the second cutter 147 moves together with the second movable pulley 146 in the arrow L direction due to a tractive force of the traction wire 151. If the second cutter 147 moves, the second absorption plate 149 is cut by the second cutter 147 along a cutting line 149c (indicated with an imaginary line) from a cut-out 149a (that is, a distal end 149b) of the second absorption plate 149.

In this manner, if the first absorption plate 148 and the second absorption plate 149 are cut, a load reaction force can be generated by the energy absorbing portion 140. Accordingly, a load reaction force is generated in the upper front corner portion 35f (that is, the airbag's bag body 31), and the airbag's bag body 31 can be allowed to move in an arrow K direction.

In addition, the plate thickness dimension T7 of the first absorption plate 148 is set to be smaller than the plate thickness dimension T8 of the second absorption plate 149. Thus, a load reaction force restraining the upper half 22a of the body of the occupant 22 (refer to FIG. 9) can be increased in multiple stages from the early restraint period to the later restraint period. Accordingly, an excessively large load reaction force is inhibited from acting on the upper half 22a of the body of the occupant 22 during the early restraint period, and a relatively large load reaction force can be caused to act on the upper half 22a of the body of the occupant 22 during the later restraint period. Therefore, the upper half 22a of the body of the occupant 22 is suitably restrained, and the impact energy acting on the upper half 22a of the body of the occupant 22 can be suitably absorbed by performing mechanical control.

Moreover, according to the energy absorbing portion 140 of the third embodiment, the first absorption plate 148 and the second absorption plate 149 are configured to be cut to generate a load reaction force in the airbag's bag body 31. Accordingly, stability of a load reaction force with respect to a change in a direction of a load (that is, a pulling input of the airbag's bag body 31) for cutting the first absorption plate 148 and the second absorption plate 149 is achieved, and the degree of freedom in design can be enhanced.

In addition, according to the energy absorbing portion 140 of the third embodiment, the first movable pulley 144 and the second movable pulley 146 are configured to be movable. Accordingly, a large moving amount of the upper portion (specifically, the upper front corner portion 35f) of the airbag's bag body 31 can be ensured, so that size reduction of the energy absorbing portion 140 can be realized.

Fourth Embodiment

Figure 20:
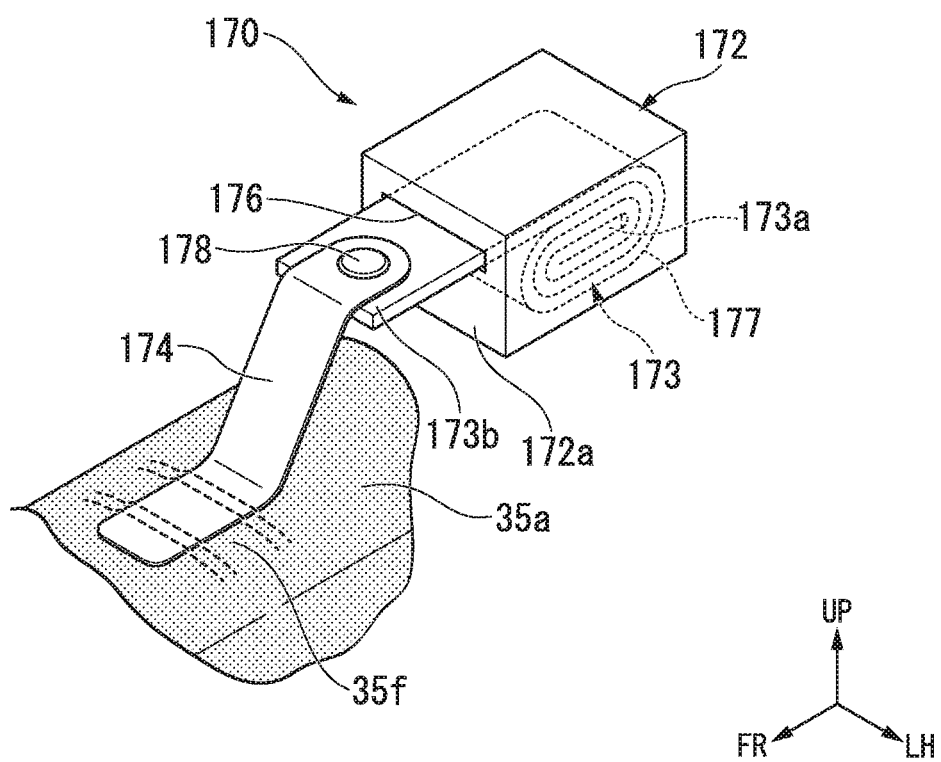
FIG. 20 is a perspective view illustrating an energy absorbing portion according to a fourth embodiment of the present invention.

As illustrated in FIG. 20, for example, an energy absorbing portion 170 includes an accommodation box 172, an absorption plate (a plate-shaped member) 173, and a coupling tether (a coupling strap) 174.

The accommodation box 172 is formed in a box shape such that the wound absorption plate 173 can be accommodated, and an opening portion 176 is formed in a front wall 172a. The absorption plate 173 is wound in a spiral shape from a proximal end portion 173a side, and a wound part 177 (which will hereinafter be referred to as a wound portion) is accommodated inside the accommodation box 172.

In addition, a distal end portion 173b of the absorption plate 173 protrudes outward from the opening portion 176 of the accommodation box 172. The absorption plate 173 is formed of a steel plate or a resin plate in a rectangular belt shape. The distal end portion 173b of the absorption plate 173 is coupled to the upper front corner portion 35f in the upper end 35a of the first bag body 35 via the coupling tether 174 and a fixing member 178.

In this manner, if the absorption plate 173 is accommodated in a wound state, an accommodation space of the energy absorbing portion 170 can be minimized.

Figure 21:
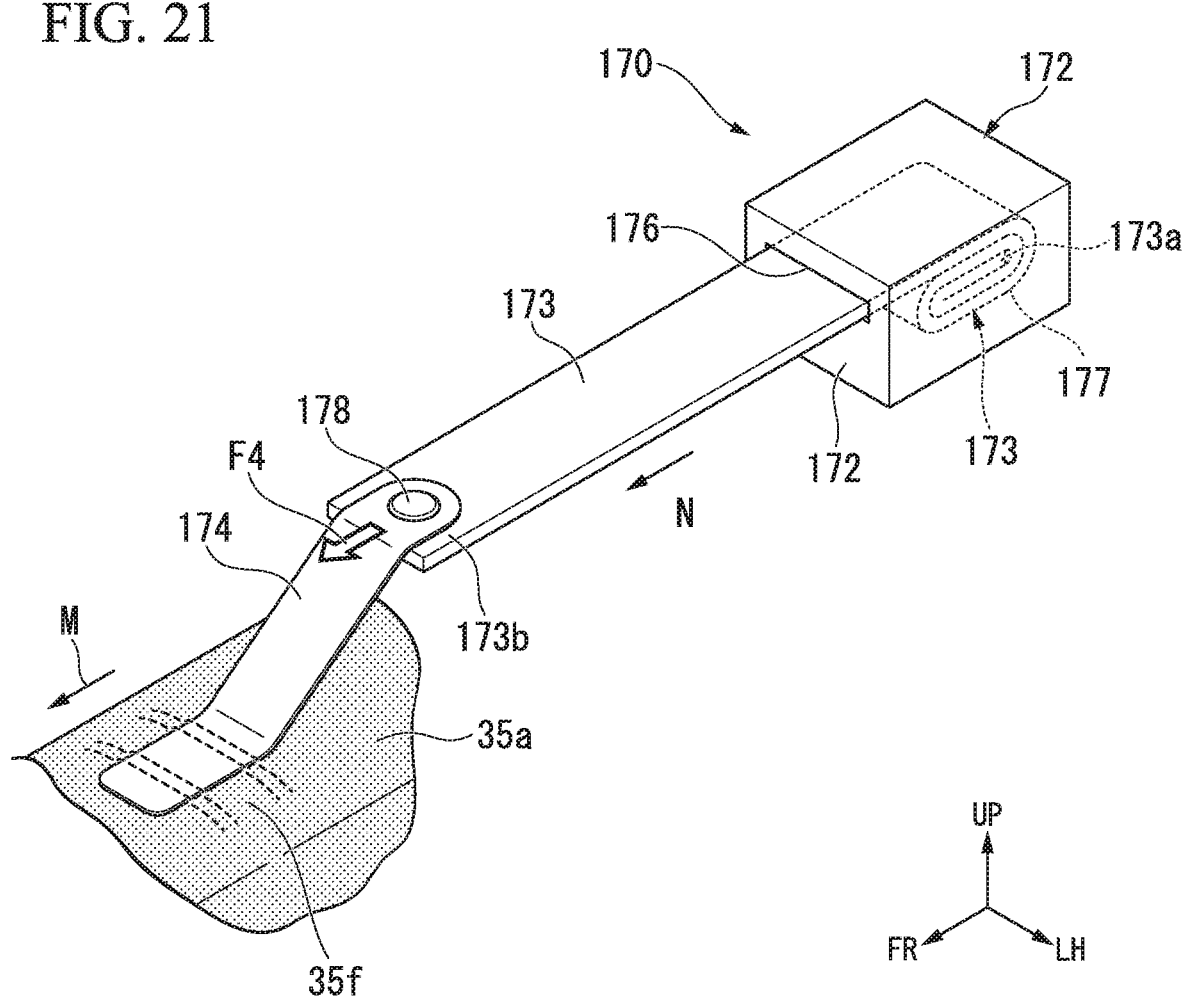
FIG. 21 is a perspective view describing an example of the energy absorbing portion according to the fourth embodiment of the present invention absorbing impact energy.

Next, an example of generating a load reaction force by the energy absorbing portion 170 of a fourth embodiment will be described on the basis of FIGS. 20 and 21. First, in a state in which the airbag's bag body 31 inflates to be spread, the front side and both sides of the upper half 22a of the body of the occupant 22 (refer to FIG. 9) are surrounded with the airbag's bag body 31. In this state, the upper half 22a of the body of the occupant 22 moves toward the second bag body 36 on the front side of the vehicle body and is restrained by the airbag's bag body 31.

The distal end portion 173b of the absorption plate 173 is coupled to the upper front corner portion 35f of the airbag's bag body 31 via the coupling tether 174.

Thus, when the upper half 22a of the body of the occupant 22 is restrained, the upper front corner portion 35f of the airbag's bag body 31 moves in an arrow M direction. Accordingly, a load F4 is input to the distal end portion 173b of the absorption plate 173 and the absorption plate 173 is pulled in the arrow F direction due to a pulling input of the upper front corner portion 35f. Here, the absorption plate 173 is wound in a spiral shape from the proximal end portion 173a side, and the wound portion 177 that has been wound is accommodated inside the accommodation box 172.

Thus, if the absorption plate 173 is pulled by the load F4, the absorption plate 173 is stretched in an arrow N direction from the state of a spiral shape. Accordingly, a load reaction force is generated in the upper front corner portion 35f (that is, the airbag's bag body 31), and the airbag's bag body 31 can be allowed to move in the arrow M direction.

In addition, if the absorption plate 173 is stretched from a wound state, the pulling amount of the absorption plate 173 (that is, the moving amount of the upper portion of the airbag apparatus) can be significantly ensured. In addition, if the absorption plate 173 is accommodated in a wound state, the accommodation space of the energy absorbing portion 170 is minimized. Accordingly, size reduction of the energy absorbing portion 170 can be realized in a state in which the moving amount (that is, an operation stroke) of the absorption plate 173 is ensured.

In addition, if the plate thickness dimension of the absorption plate 173 is changed, a load reaction force can be simply adjusted. For example, if a relatively small plate thickness dimension of the absorption plate 173 is set, a load reaction force can be simply adjusted to be low. In addition, if a relatively large plate thickness dimension of the absorption plate 173 is set, a load reaction force can be simply adjusted to be high.

Moreover, if the plate thickness dimension of the absorption plate 173 is increased in stages from the front end portion side toward the rear end portion side, a load reaction force can be adjusted in stages. Accordingly, the impact energy acting on the upper half 22a of the body of the occupant 22 (refer to FIG. 9) can also be absorbed in multiple stages.

In place of the wound portion 177 (the absorption plate 173), for example, a torsion bar can also be used. IF the torsion bar is deformed, a load reaction force is generated in the upper front corner portion 35f (that is, the airbag's bag body 31), and the airbag's bag body 31 can be allowed to move in the arrow M direction.

Fifth Embodiment

Figure 22:
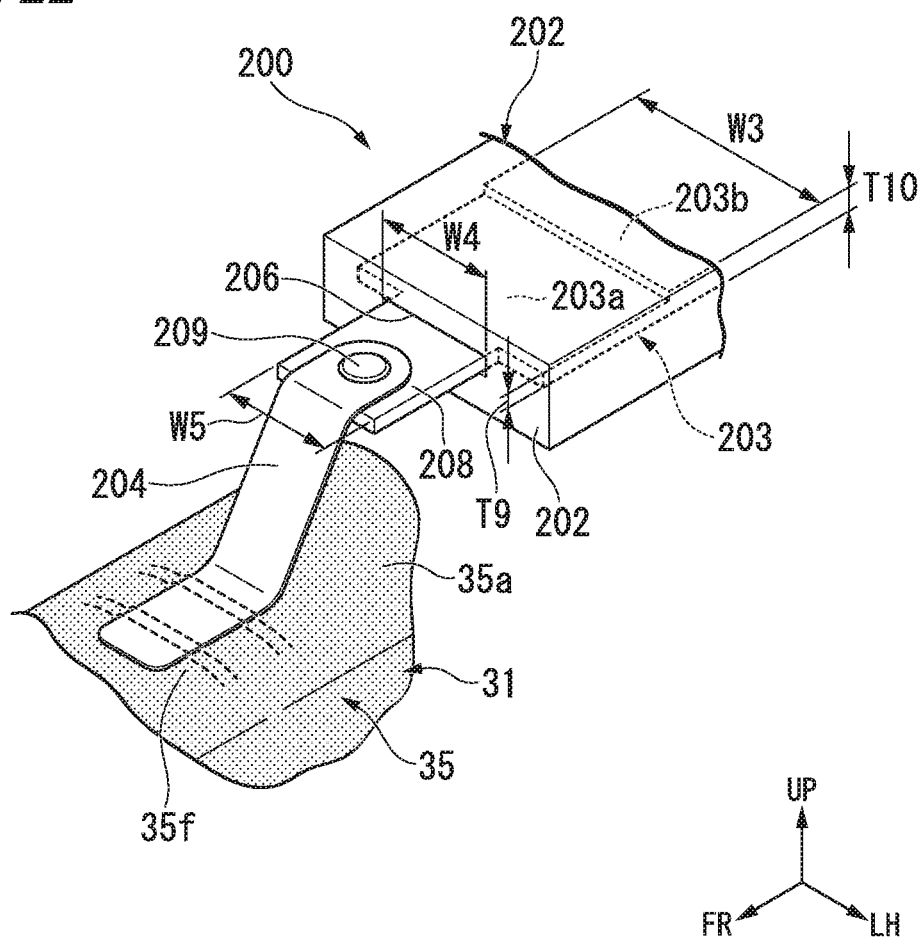
FIG. 22 is a perspective view illustrating an energy absorbing portion according to a fifth embodiment of the present invention.

As illustrated in FIG. 22, for example, an energy absorbing portion 200 includes a box member 202, an absorption plate (a plate-shaped member) 203, and a coupling tether (a coupling strap) 204.

The box member 202 is formed in a box shape such that the absorption plate 203 can be accommodated, and an opening portion 206 is formed in a front wall 202a. The opening portion 206 is formed to have a width dimension W4 smaller than a width dimension W3 of the absorption plate 203.

The absorption plate 203 is formed of a steel plate or a resin plate in a rectangular belt shape. For example, in the absorption plate 203, a distal end portion 203a is formed to have a plate thickness dimension T9, and a different part 203b is formed to have a plate thickness dimension T10. The plate thickness dimension T10 of the different part 203b is formed to be larger than the plate thickness dimension T9 of the distal end portion 203a.

A coupling portion 208 penetrates the opening portion 206 of the absorption plate 203 toward the front side of the vehicle body. The coupling portion 208 is formed in the middle of the distal end portion 203a of the absorption plate 203 in the vehicle width direction. The coupling portion 208 is coupled to the upper front corner portion 35f of the airbag's bag body 31 via the coupling tether 204 and a fixing member 209.

Figure 23:
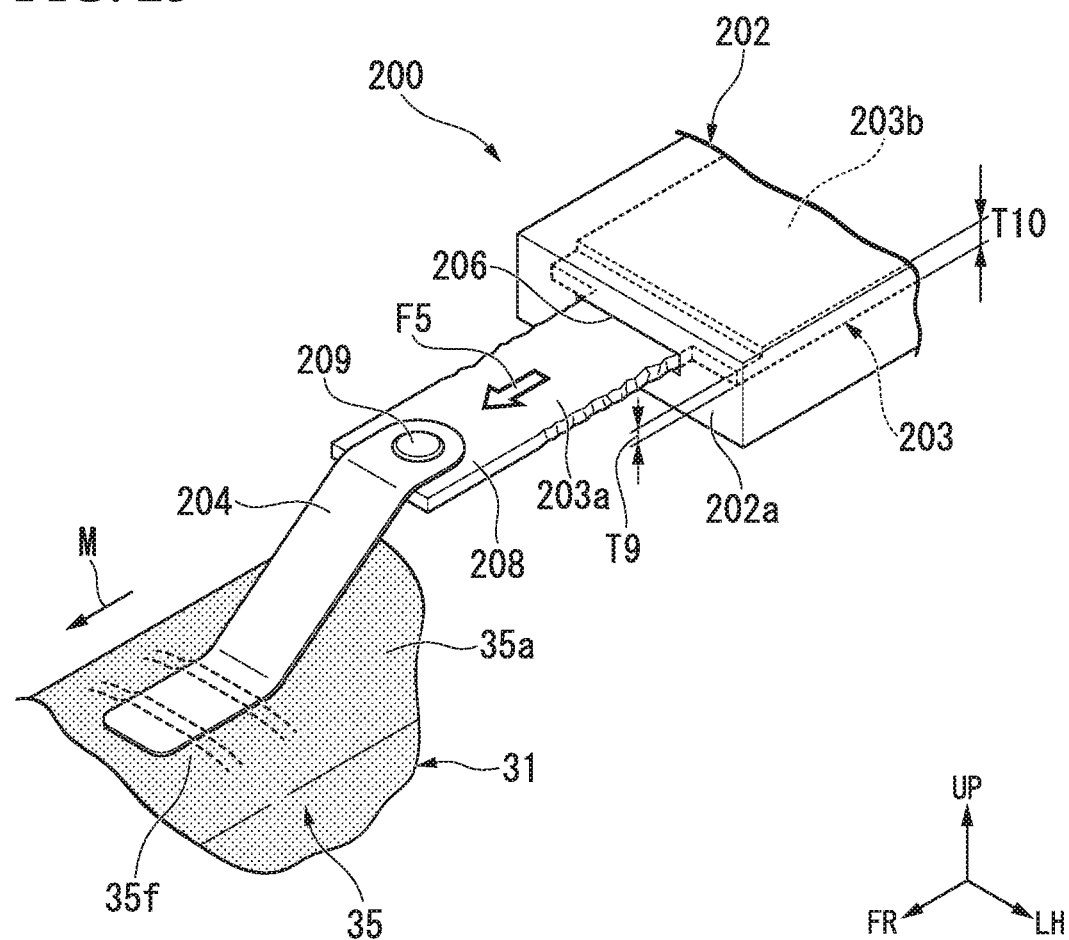
FIG. 23 is a perspective view describing an example of the energy absorbing portion according to the fifth embodiment of the present invention absorbing impact energy.

Next, an example of generating a load reaction force by the energy absorbing portion 200 of a fifth embodiment will be described on the basis of FIGS. 22 and 23. First, in a state in which the airbag's bag body 31 inflates to be spread, the front side and both sides of the upper half 22a of the body of the occupant 22 (refer to FIG. 9) are surrounded with the airbag's bag body 31. In this state, the upper half 22a of the body of the occupant 22 moves toward the second bag body 36 on the front side of the vehicle body and is restrained by the airbag's bag body 31.

The upper front corner portion 35f of the airbag's bag body 31 is coupled to the coupling portion 208 of the absorption plate 203 via the coupling tether 204.

Thus, when the upper half 22a of the body of the occupant 22 is restrained, the upper front corner portion 35f of the airbag's bag body 31 moves in an arrow O direction. Accordingly, the coupling portion 208 is pulled in the arrow O direction due to a pulling input of the upper front corner portion 35f. When the absorption plate 203 is pulled due to a load F5 and the distal end portion 203a of the absorption plate 203 is drawn out through the opening portion 206, the distal end portion 203a of the absorption plate 203 is deformed, so that a load reaction force can be generated. Accordingly, a load reaction force is generated in the upper front corner portion 35f (that is, the airbag's bag body 31), and the airbag's bag body 31 can be allowed to move in the arrow O direction.

In addition, in the absorption plate 203, the plate thickness dimension T10 of the different part 203b is formed to be larger than the plate thickness dimension T9 of the distal end portion 203a. In this manner, if the plate thickness dimension of the absorption plate 203 is increased in stages from the distal end portion 203a toward the different part 203b, a load reaction force restraining the upper half 22a of the body of the occupant 22 (refer to FIG. 9) can be increased in multiple stages from the early restraint period to the later restraint period.

Accordingly, an excessively large load reaction force is inhibited from acting on the upper half 22a of the body of the occupant 22 during the early restraint period, and a relatively large load reaction force can be caused to act on the upper half 22a of the body of the occupant 22 during the later restraint period. Therefore, the upper half 22a of the body of the occupant 22 is suitably restrained, and the impact energy acting on the upper half 22a of the body of the occupant 22 can be suitably absorbed by performing mechanical control.

Moreover, when the absorption plate 203 is drawn out through the opening portion 206 of the box member 202, the absorption plate 203 is deformed to generate a load reaction force. Thus, if the plate thickness dimension of the absorption plate 203 is changed, a load reaction force can be simply adjusted. For example, if a relatively small plate thickness dimension of the absorption plate 203 is set, a load reaction force can be simply adjusted to be low. In addition, if a relatively large plate thickness dimension of the absorption plate 203 is set, a load reaction force can be simply adjusted to be high.

Sixth Embodiment

Figure 24:
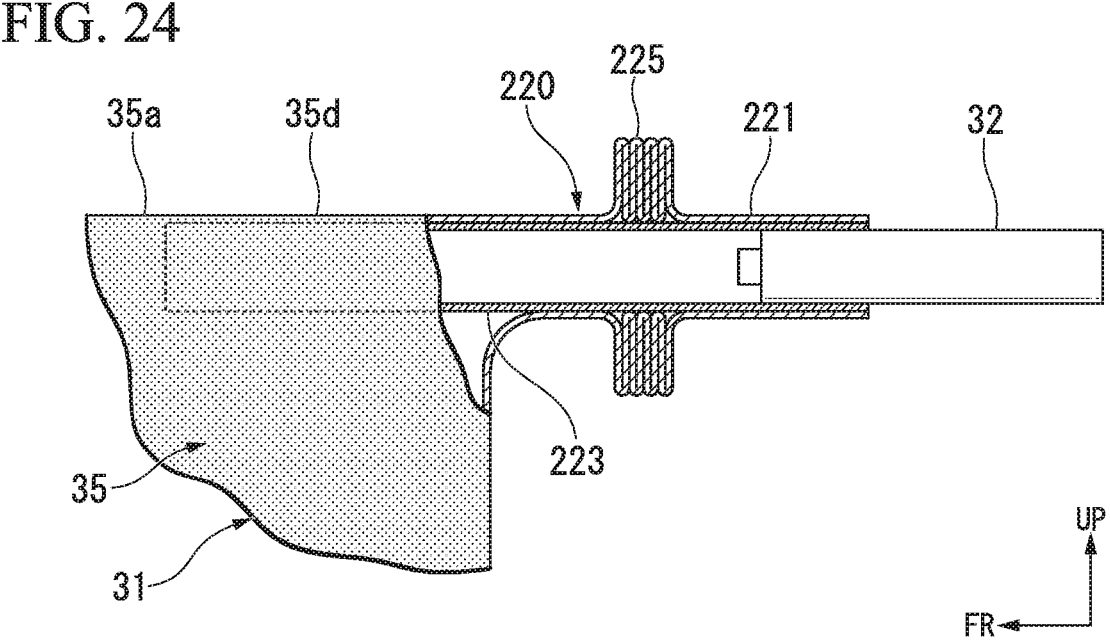
FIG. 24 is a cross-sectional view illustrating a communication state between the airbag's bag body and the inflator according to a sixth embodiment of the present invention.

As illustrated in FIG. 24, a communication portion 220 includes a peripheral wall 221 and an inner peripheral wall 223.

The peripheral wall 221 is formed in a tubular shape such that the upper rear corner portion 35d of the upper end 35a of the first bag body 35 and the inflator 32 communicate with each other. Moreover, the peripheral wall 221 has a bellows portion 225 which is folded in a bellows shape (a peripheral wall contracted in a bellows shape). Accordingly, the peripheral wall 221 is retained in a contracted state in the bellows portion 225. If the peripheral wall 221 is contracted in a bellows shape, the contracted peripheral wall 221 can be retained in a hollow shape.

The inner peripheral wall 223 is accommodated inside the peripheral wall 221. The inner peripheral wall 223 is formed in a tubular shape such that the upper rear corner portion 35d of the upper end 35a of the first bag body 35 and the inflator 32 communicate with each other.

In addition, the inner peripheral wall 223 is provided inside the communication portion 220. Therefore, the peripheral wall 221 (particularly, the bellows portion 225) contracted in a bellows shape is covered with the inner peripheral wall 223. Thus, the inner peripheral wall 223 can inhibit gas from infiltrating into the bellows portion 225 when the airbag's bag body 31 inflates to be spread. Accordingly, extension of the bellows portion 225 is inhibited when gas is supplied to the airbag's bag body 31 from the inflator 32, so that gas can be smoothly supplied to the airbag's bag body 31 from the inner peripheral wall 223. As a result, the airbag's bag body 31 can be caused to more quickly inflate to be spread.

Figure 25:
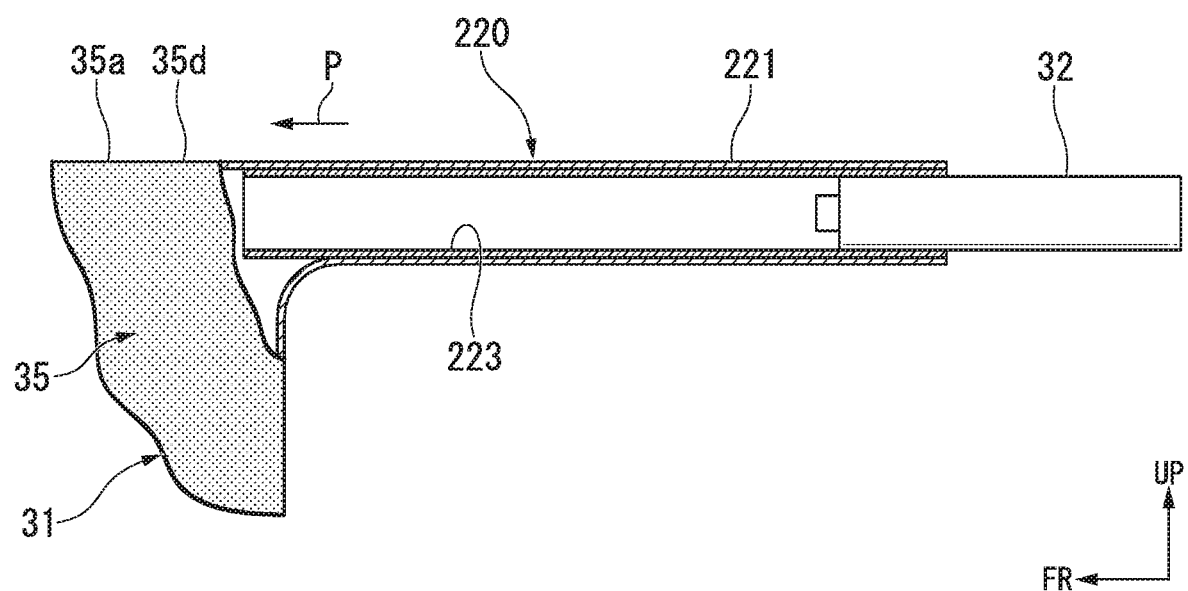
FIG. 25 is a cross-sectional view describing an example of extending a communication portion in a manner of following the airbag's bag body according to the sixth embodiment of the present invention.

As illustrated in FIG. 25, if the upper half 22a of the body of the occupant 22 (refer to FIG. 9) is restrained by the airbag's bag body 31 that has inflated to be spread, the airbag's bag body 31 moves in an arrow P direction. Thus, a load is input from the airbag's bag body 31 to the bellows portion 225. Accordingly, the airbag's bag body 31 can be allowed to move in the arrow P direction by extending the bellows portion 225. As a result, the upper half 22a of the body of the occupant 22 can be more favorably restrained and protected by the airbag's bag body 31.

Seventh Embodiment

Figure 26:
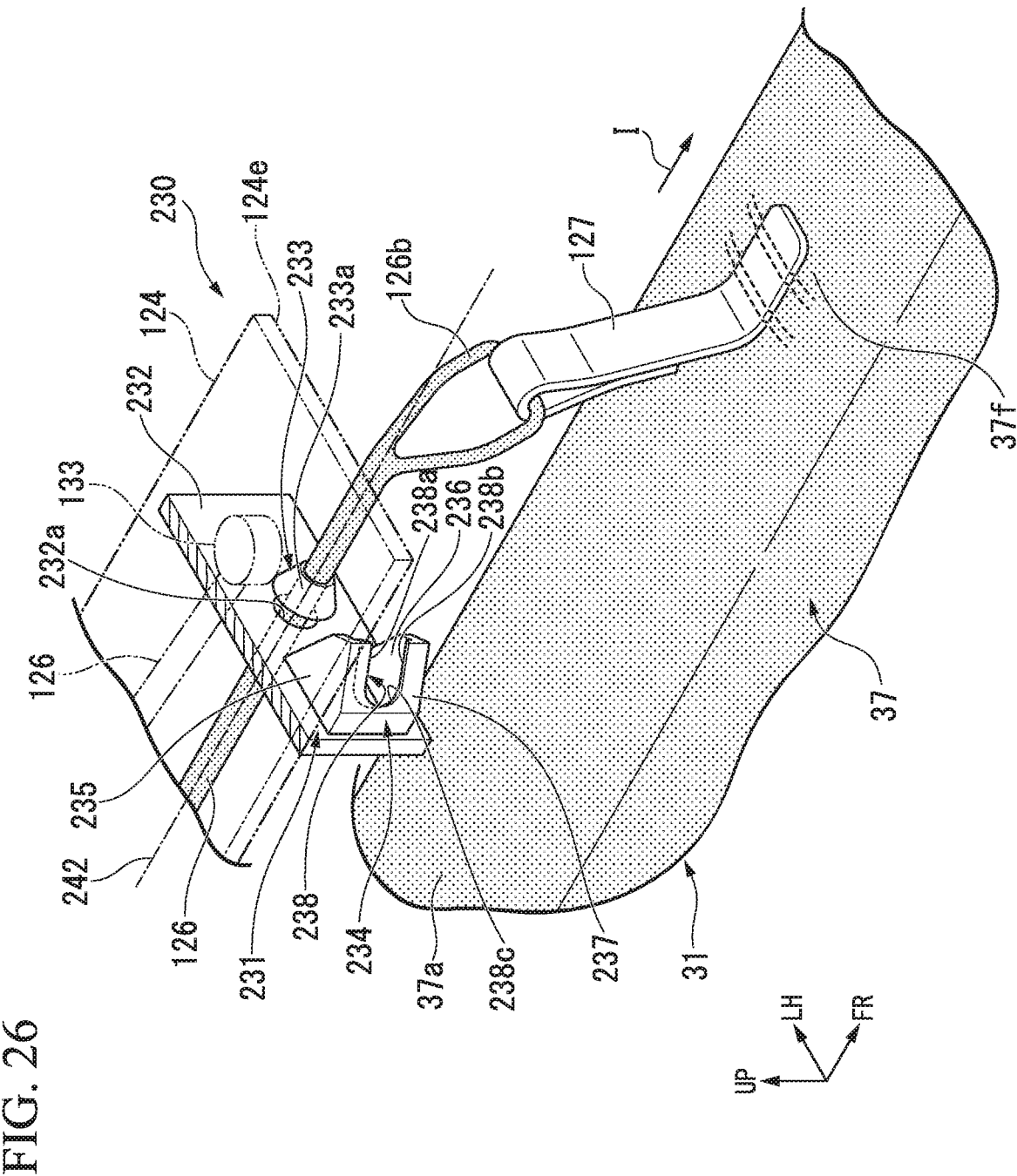
FIG. 26 is a perspective view illustrating an energy absorbing portion according to a seventh embodiment of the present invention.

As illustrated in FIG. 26, an energy absorbing portion 230 is constituted by providing a movement restricting mechanism 231 in the energy absorbing portion 120 of the second embodiment, and other configurations are similar to those of the energy absorbing portion 120 of the second embodiment. The movement restricting mechanism 231 is configured to restrict movement in the vehicle width direction. Specifically, for example, the movement restricting mechanism 231 includes a support plate 232, a stopper 233, and a stopper block 234.

In the second embodiment, an example of the energy absorbing portion 120 provided at the upper end 35a of the first bag body 35 has been described. In the seventh embodiment, in order to make the configuration easy to understand, an example of the energy absorbing portion 230 provided at the upper end 37a of the third bag body 37 will be described.

For example, the support plate 232 extends in the vehicle width direction in a state of protruding downward from a lower surface 124e of the absorption plate 124. The support plate 232 has an opening portion 232a. The opening portion 232a is formed in a circular shape in the middle of the support plate 232 in the vehicle width direction. The traction wire 126 is formed in a circular shape in a cross section. The proximal end portion 126a of the traction wire 126 (refer to FIG. 16) is attached to the absorption plate 124 by the fixing member 133.

The distal end portion 126b of the traction wire 126 penetrates the opening portion 232a. The distal end portion 126b of the traction wire 126 is coupled to the upper front corner portion 37f in the upper end 37a of the third bag body 37 via the coupling tether 127.

The stopper 233 is attached to the traction wire 126 on the distal end portion 126b side in a fitted state. The stopper 233 is disposed on the front side of the vehicle body of the opening portion 232a. In addition, an outer circumferential surface 233a of the stopper 233 is formed to be temporarily reduced in diameter toward the front side of the vehicle body. That is, the outer circumferential surface 233a of the stopper 233 is formed in a truncated cone shape.

In addition, the stopper block 234 is attached to a surface of the support plate 232 on the front side of the vehicle body, that is, the outer side of the opening portion 232a in the vehicle width direction. The stopper block 234 includes an upper plate 235, a lower plate 236, and a side surface plate 237.

The side surface plate 237 is coupled to an outer inclined side of the upper plate 235 and an outer inclined side of the lower plate 236. The side surface plate 237 is formed in an inclined shape to be inclined on the inner side in the vehicle width direction from the proximal end portion toward the distal end portion (that is, toward the front side of the vehicle body). The side surface plate 237 has a stopper groove portion 238. The stopper groove portion 238 has an upper groove wall 238a, a lower groove wall 238b, and a groove bottom portion 238c.

The upper groove wall 238a and the lower groove wall 238b are disposed in a parallel manner with a predetermined space therebetween. The distal end portion of the stopper groove portion 238 is formed in an open state due to the distal end portion of the upper groove wall 238a and the distal end portion of the lower groove wall 238b. The proximal end portion of the upper groove wall 238a and the proximal end portion of the lower groove wall 238b are coupled to the groove bottom portion 238c. The groove bottom portion 238c is formed in a recessed curved shape.

Figure 29:
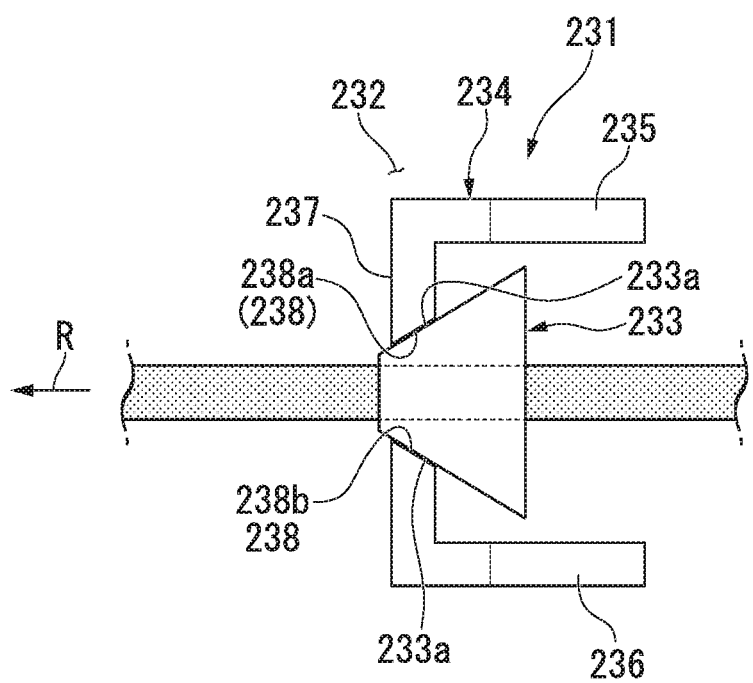
FIG. 29 is an arrow view of the energy absorbing portion according to the seventh embodiment of the present invention seen in a direction of line XXIX-XXIX in FIG. 28.
Figure 29:
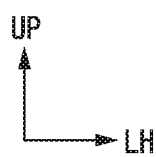

The upper groove wall 238a and the lower groove wall 238b are formed in an inclined shape in a direction gradually approaching each other toward the outer side in the vehicle width direction (refer to FIG. 29). The groove bottom portion 238c is formed in an inclined shape in a direction gradually approaching the front side of the vehicle body toward the outer side in the vehicle width direction (refer to FIG. 27).

The stopper groove portion 238 is disposed at a position where the stopper 233 can be received when an inclination angle θ2 of the traction wire 126 (refer to FIG. 28) is large to a certain extent. Moreover, the stopper groove portion 238 (that is, the upper groove wall 238a, the lower groove wall 238b, and the groove bottom portion 238c) is formed on an inclination surface along the outer circumferential surface 233a of the stopper 233 in a state in which the stopper 233 is received.

Next, an example of generating a load reaction force by the energy absorbing portion 230 of the seventh embodiment will be described on the basis of FIG. 26. That is, in the energy absorbing portion 230, similar to the energy absorbing portion 120 of the second embodiment, the upper front corner portion 37f of the airbag's bag body 31 moves in the arrow I direction to cope with an impact load from the front side of the vehicle body, such that the upper half 22a of the body of the occupant 22 is restrained. In this state, the stopper 233 is disposed at a position away from the stopper block 234.

Thus, the distal end portion 126b of the traction wire 126 is pulled in the arrow I direction due to a pulling input of the upper front corner portion 35f. Thus, if the traction wire 126 is drawn out, the cutter 125 (refer to FIG. 16) moves, so that the absorption plate 124 is cut by the cutter 125.

Accordingly, a load reaction force is generated in the upper front corner portion 37f of the airbag's bag body 31, and the airbag's bag body 31 can be allowed to move in the arrow I direction (that is, the front side of the vehicle body).

Subsequently, a case, in which the traction wire 126 is inclined by the inclination angle θ2 on the outer side in the vehicle width direction with respect to an extension line 242 extending in the front-rear direction of the vehicle body, will be described on the basis of FIGS. 27 to 29.

First, a case, in which the inclination angle θ2 of the traction wire 126 is relatively small, for example, 30 degrees, with respect to the extension line 242, will be described on the basis of FIG. 27.

Figure 27:
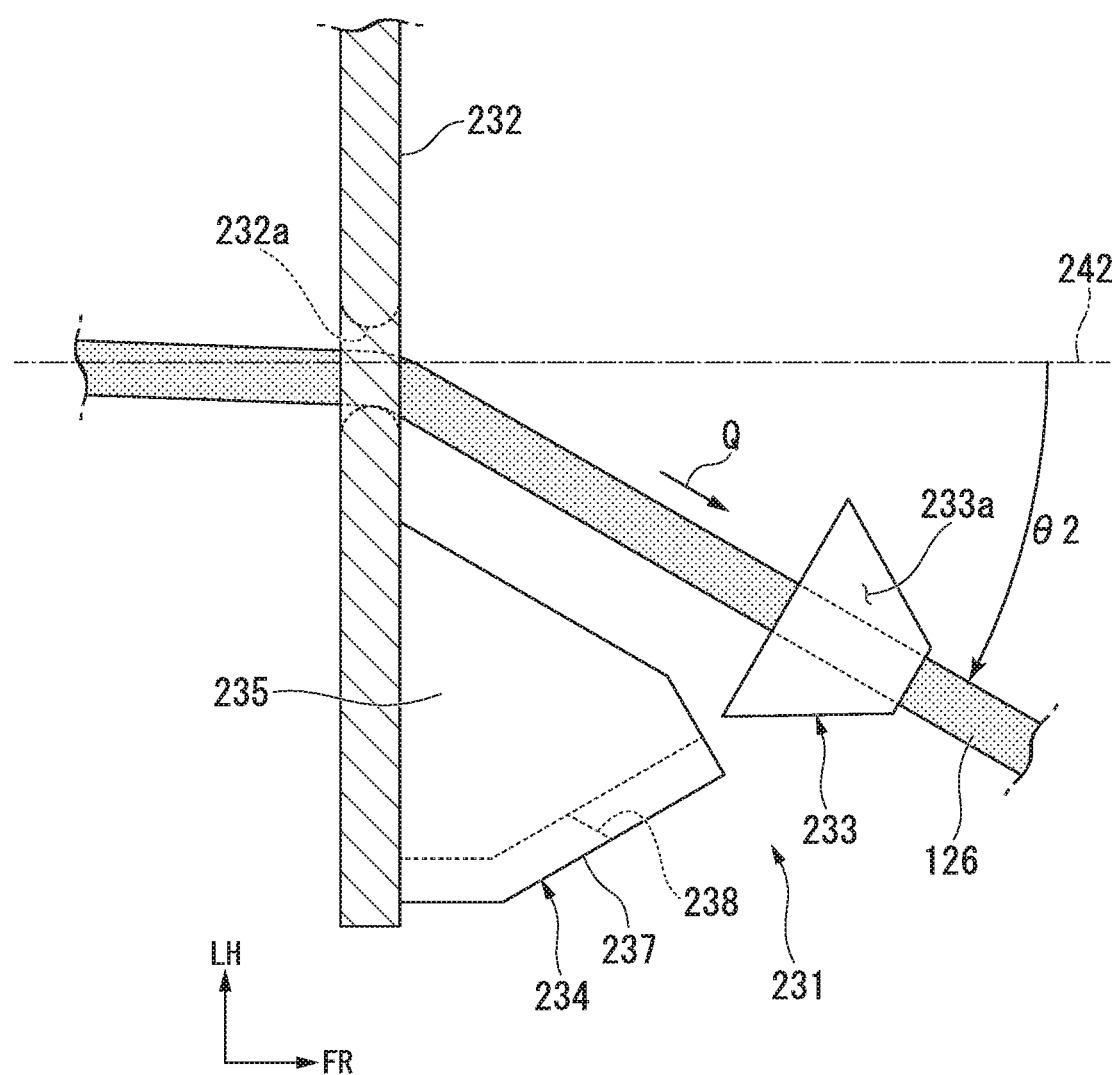
FIG. 27 is a cross-sectional view describing action when an inclination angle of a traction wire of the energy absorbing portion according to the seventh embodiment of the present invention is relatively small with respect to an extension line.

As illustrated in FIG. 27, it is assumed that when coping with an impact load from the front side of the vehicle body, the traction wire 126 is inclined by the inclination angle θ2 which is relatively small, for example, 30 degrees with respect to the extension line 242.

In this state, the stopper 233 is disposed at a position away from the stopper block 234.

Thus, the distal end portion 126b of the traction wire 126 is pulled in an arrow Q direction to cope with an impact load from the front side of the vehicle body. Thus, if the traction wire 126 is drawn out, the cutter 125 (refer to FIG. 16) moves, so that the absorption plate 124 is cut by the cutter 125.

Accordingly, a load reaction force is generated in the upper front corner portion 37f (that is, the airbag's bag body 31), and the airbag's bag body 31 can be allowed to move in the arrow Q direction.

Next, a case, in which the inclination angle θ2 of the traction wire 126 is relatively large, for example, 60 degrees with respect to the extension line 242, will be described on the basis of FIGS. 28 and 29. When the inclination angle θ2 of the traction wire 126 relatively large, for example, 60 degrees or larger with respect to the extension line 242, it is assumed that the traction wire 126 is directed in the vehicle width direction.

Figure 28:
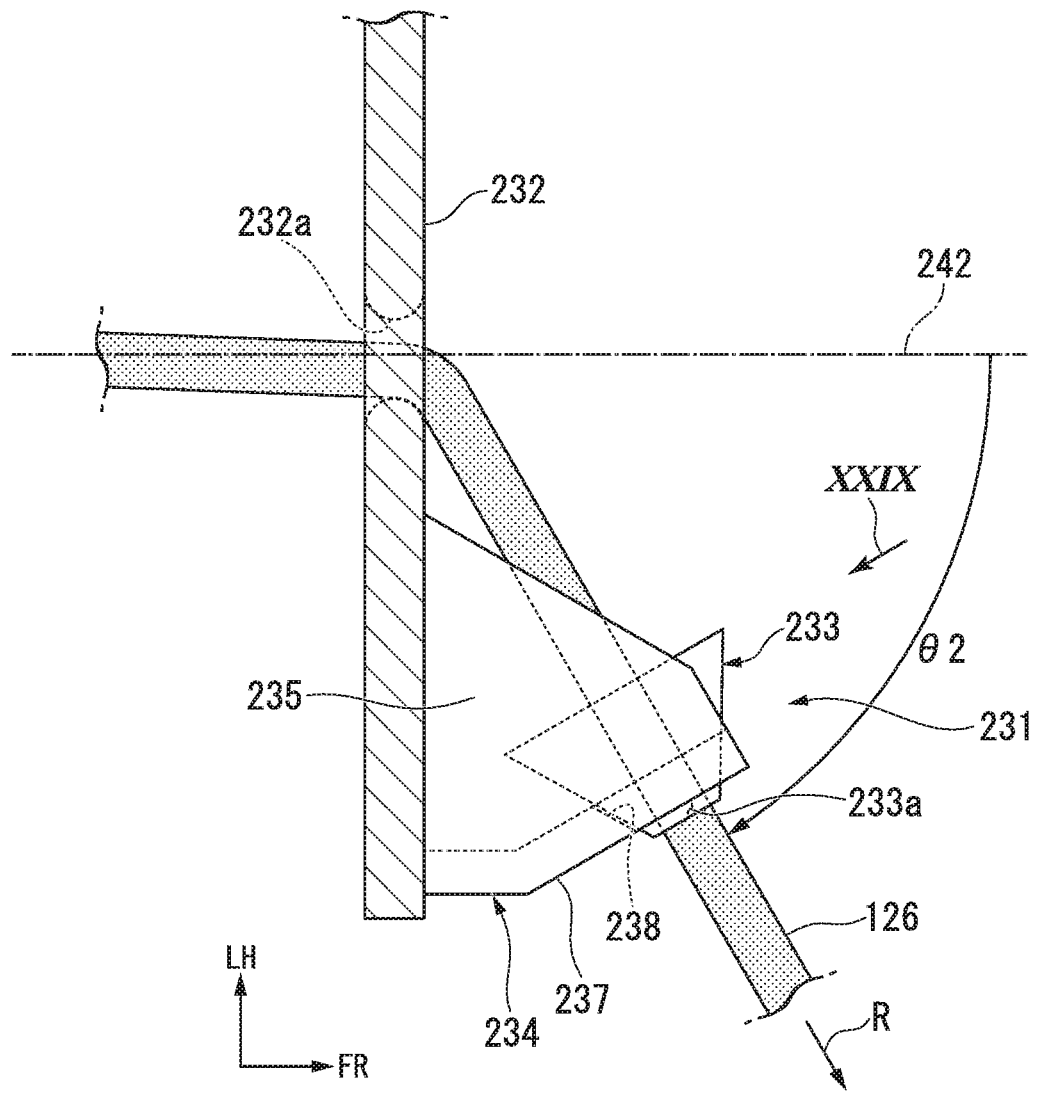
FIG. 28 is a cross-sectional view describing action when the inclination angle of the traction wire of the energy absorbing portion according to the seventh embodiment of the present invention is relatively large with respect to the extension line.

As illustrated in FIGS. 28 and 29, for example, when coping with an impact load from a side of the vehicle body, a load in an arrow R direction is input to the traction wire 126. It is assumed that the traction wire 126 is inclined by the inclination angle θ2 which is relatively large, for example, 60 degrees with respect to the extension line 242, and the traction wire 126 is directed in the vehicle width direction.

In this case, the stopper 233 enters the stopper groove portion 238 of the stopper block 234 and is housed therein. The stopper 233 is formed in a tapered shape such that the outer circumferential surface 233a is increased in diameter toward the proximal end portion. Thus, the movement restricting mechanism 231 can block the traction wire 126 from being drawn out to the outer side in the vehicle width direction due to a load in the arrow R direction input to the traction wire 126. Accordingly, in a state in which the upper half 22a of the body of the occupant 22 (refer to FIG. 9) is restrained by the airbag's bag body 31, movement of the airbag's bag body 31 in the vehicle width direction can be restricted. As a result, the upper half 22a of the body of the occupant 22 can be more favorably restrained by the airbag's bag body 31.

In addition, even when the inclination angle θ2 of the traction wire 126 exceeds 60 degrees with respect to the extension line 242, similar to the case in which the inclination angle θ2 is 60 degrees, the movement restricting mechanism 231 can block the traction wire 126 from being drawn out to the outer side in the vehicle width direction.

The technical scope of the present invention is not limited to the embodiments described above, and various changes can be applied within a range not departing from the gist of the present invention.

For example, according to the first embodiment to the seventh embodiment described above, as an airbag apparatus 20, the airbag apparatus 20 which restrains and protects an occupant sitting on the passenger seat 14 has been described as a representative example. However, the embodiments are not limited thereto. As an alternative example, for example, the present invention can also be applied to a driver sitting on the driver's seat 13, or an occupant sitting on a rear seat.

Moreover, according to the first embodiment to the seventh embodiment described above, the airbag apparatus 20 which restrains and protects one occupant sitting on the passenger seat 14 has been described as a representative example. However, the embodiments are not limited thereto. As an alternative example, the airbag apparatus 20 can also be configured to collectively restrain and protect both a driver sitting on the driver's seat and an occupant sitting on the passenger seat 14.

Alternatively, the airbag apparatus 20 can also be configured to collectively restrain and protect both an occupant sitting on the left side in the vehicle width direction and an occupant sitting on the right side in the vehicle width direction in the rear seat.

In addition, according to the first embodiment to the seventh embodiment described above, an example, in which the first bag body 35, the second bag body 36, and the third bag body 37 respectively inflate to be spread on the right side, the front side, and the left side of the upper half 22a of the body of the occupant 22, has been described. However, the embodiments are not limited thereto. As an alternative example, for example, in a case of a vehicle in which the occupant 22 sits while facing the rear side of the vehicle body, the right side of the vehicle body, or the left side of the vehicle body, a first bag body, a second bag body, and a third bag body can also be configured to inflate to be spread to cope with the direction of the upper half 22a of the body of the occupant 22 being seated.

Moreover, according to the first embodiment to the seventh embodiment described above, an example, in which a load reaction force is further increased during the later restraint period than the early restraint period with respect to an occupant when the occupant is restrained by an energy absorbing portion, has been described.

In addition, an example, in which a load reaction force is increased in multiple stages from the early restraint period to the later restraint period when an occupant is restrained by an energy absorbing portion, has been described.

Here, the load acting on the airbag apparatus 20 changes depending on the vehicle 10 including the airbag apparatus 20 when an occupant is restrained by the airbag apparatus 20. As an example, a load acting on the airbag apparatus 20 changes depending on whether the vehicle is a small-sized vehicle or a large-sized vehicle when an occupant is restrained by the airbag apparatus 20.

For example, there is an airbag apparatus having a configuration in which an intermediate load acts during the early restraint period, a heavy load acts thereafter, and a light load acts during the later restraint period when an occupant is restrained by the airbag apparatus 20. On the other hand, there is an airbag apparatus having a configuration in which a light load acts during the early restraint period, an intermediate load acts thereafter, and a heavy load acts during the later restraint period. Alternatively, there is an airbag apparatus having a configuration in which a light load, an intermediate load, and a heavy load act in an appropriately combined state.

In this case, it is preferable that a load reaction force change in accordance with each of the light load, the intermediate load, and the heavy load from the early restraint period to the later restraint period with respect to an occupant.

Accordingly, the airbag apparatus 20 can be employed for various kinds of vehicles 10, and the usage of the airbag apparatus 20 can be expanded.

In addition, according to the first embodiment to the seventh embodiment described above, for example, the first to sixth energy absorbing portions 71 to 76 have been described such that they have a similar configuration. However, the embodiments are not limited thereto. As an alternative example, for example, load reaction forces generated by the first to sixth energy absorbing portions 71 to 76 can also be set to values different from each other.

Here, when the upper half 22a of the body of the occupant 22 is restrained by the airbag's bag body 31, a different restraining force is applied to each part of the occupant 22 (for example, the chest or the head) restrained by the airbag's bag body 31. Therefore, for example, load reaction forces generated by the first to sixth energy absorbing portions 71 to 76 are respectively set to values different from each other.

Accordingly, if a load reaction force of the first to sixth energy absorbing portions 71 to 76 is changed, a load reaction force can be adjusted for each part of the occupant 22 (for example, the chest or the head) restrained by the airbag's bag body 31. As a result, the upper half 22a of the body of the occupant 22 can be more favorably restrained and protected by the airbag's bag body 31.

What is claimed is:

1. An airbag apparatus which inflates to be spread such that a front side and both sides of at least one occupant are surrounded, the airbag apparatus comprising:
   an airbag's bag body that has a first bag body, a second bag body, and a third bag body which are integrally formed and inflate to be spread on one side, the front side, and the other side of the occupant; and
   an energy absorbing portion that causes an upper portion of the first bag body and an upper portion of the third bag body to be coupled to a vehicle body, generates a load reaction force for supporting the airbag's bag body when the occupant is restrained, and allows the airbag's bag body to move,
   wherein the energy absorbing portion is configured to cause the load reaction force restraining the occupant to change during a later restraint period rather than an early restraint period with respect to the occupant.

2. The airbag apparatus according to claim 1,
   wherein the energy absorbing portion is configured to generate the load reaction force and to allow the airbag's bag body to move by operating a pulley.

3. The airbag apparatus according to claim 1,
   wherein the energy absorbing portion includes
      a plate-shaped member which is coupled to the upper portion via a coupling portion, and
      a box member which accommodates the plate-shaped member and has an opening portion penetrating the coupling portion and being formed to have a width dimension smaller than a width dimension of the plate-shaped member, and
   wherein the plate-shaped member is deformed to generate the load reaction force when the plate-shaped member is drawn out through the opening portion.

4. The airbag apparatus according to claim 1,
   wherein the energy absorbing portion includes a movement restricting mechanism which restricts the airbag's bag body from moving in a vehicle width direction.

5. The airbag apparatus according to claim 1,
   wherein a plurality of energy absorbing portions are provided, and a load reaction force generated by each of the energy absorbing portions is set to a different value.

6. An airbag apparatus which inflates to be spread such that a front side and both sides of at least one occupant are surrounded, the airbag apparatus comprising:
   an airbag's bag body that has a first bag body, a second bag body, and a third bag body which are integrally formed and inflate to be spread on one side, the front side, and the other side of the occupant, and
   an energy absorbing portion that causes an upper portion of the first bag body and an upper portion of the third bag body to be coupled to a vehicle body, generates a load reaction force for supporting the airbag's bag body when the occupant is restrained, and allows the airbag's bag body to move,
   wherein the energy absorbing portion is configured to cause the load reaction force restraining the occupant to change in multiple stages from an early restraint period to a later restraint period.

7. The airbag apparatus according to claim 6,
   wherein the energy absorbing portion is configured to generate the load reaction force and to allow the airbag's bag body to move by operating a pulley.

8. The airbag apparatus according to claim 6,
   wherein the energy absorbing portion includes
      a plate-shaped member which is coupled to the upper portion via a coupling portion, and
      a box member which accommodates the plate-shaped member and has an opening portion penetrating the coupling portion and being formed to have a width dimension smaller than a width dimension of the plate-shaped member, and
   wherein the plate-shaped member is deformed to generate the load reaction force when the plate-shaped member is drawn out through the opening portion.

9. The airbag apparatus according to claim 6,
   wherein the energy absorbing portion includes a movement restricting mechanism which restricts the airbag's bag body from moving in a vehicle width direction.

10. The airbag apparatus according to claim 6,
    wherein a plurality of energy absorbing portions are provided, and a load reaction force generated by each of the energy absorbing portions is set to a different value.

11. An airbag apparatus which inflates to be spread such that a front side and both sides of at least one occupant are surrounded, the airbag apparatus comprising:
    an airbag's bag body that has a first bag body, a second bag body, and a third bag body which are integrally formed and inflate to be spread on one side, the front side, and the other side of the occupant; and
    an energy absorbing portion that causes an upper portion of the first bag body and an upper portion of the third bag body to be coupled to a vehicle body, generates a load reaction force for supporting the airbag's bag body when the occupant is restrained, and allows the airbag's bag body to move,
    wherein the energy absorbing portion is configured to generate the load reaction force and to allow the airbag's bag body to move by causing a plate-shaped member to be deformed when the occupant is restrained.

12. The airbag apparatus according to claim 11,
    wherein the airbag's bag body is supported in an accommodated state above the plate-shaped member.

13. The airbag apparatus according to claim 11,
wherein the energy absorbing portion is configured to generate the load reaction force and to allow the airbag's bag body to move by cutting the plate-shaped member from a distal end.

14. The airbag apparatus according to claim 11,
wherein the energy absorbing portion is configured to generate the load reaction force and to allow the airbag's bag body to move by stretching the plate-shaped member from a wound state.

15. The airbag apparatus according to claim 11,
wherein the energy absorbing portion includes
   a plate-shaped member which is coupled to the upper portion via a coupling portion, and
   a box member which accommodates the plate-shaped member and has an opening portion penetrating the coupling portion and being formed to have a width dimension smaller than a width dimension of the plate-shaped member, and
   wherein the plate-shaped member is deformed to generate the load reaction force when the plate-shaped member is drawn out through the opening portion.

16. The airbag apparatus according to claim 11,
wherein the energy absorbing portion includes a movement restricting mechanism which restricts the airbag's bag body from moving in a vehicle width direction.

17. The airbag apparatus according to claim 11,
wherein a plurality of energy absorbing portions are provided, and a load reaction force generated by each of the energy absorbing portions is set to a different value.

* * * * *